US010819437B2

(12) United States Patent
Johnson

(10) Patent No.: US 10,819,437 B2
(45) Date of Patent: Oct. 27, 2020

(54) MINIATURE EMBEDDED SELF-ORGANIZED OPTICAL NETWORK

(71) Applicant: MEADOWAVE, LLC, Washington, DC (US)

(72) Inventor: Lee James Johnson, Washington, DC (US)

(73) Assignee: MEADOWAVE, LLC, Washington, DC (US)

( * ) Notice: Subject to any disclaimer, the term of this patent is extended or adjusted under 35 U.S.C. 154(b) by 0 days.

(21) Appl. No.: 16/293,280

(22) Filed: Mar. 5, 2019

(65) Prior Publication Data
US 2020/0287627 A1    Sep. 10, 2020

(51) Int. Cl.
| H04B 10/00 | (2013.01) |
| H04B 10/27 | (2013.01) |
| H04B 10/80 | (2013.01) |

(52) U.S. Cl.
CPC ........... *H04B 10/27* (2013.01); *H04B 10/806* (2013.01)

(58) Field of Classification Search
CPC ............................ H04W 84/18; H04W 56/001
See application file for complete search history.

(56) References Cited

U.S. PATENT DOCUMENTS

| 5,726,786 A | 3/1998 | Heflinger |
| 5,926,301 A | 7/1999 | Hirt |
| 6,574,482 B1 * | 6/2003 | Radomsky ............ A61B 5/1113 |
| | | 455/517 |
| 6,634,812 B2 | 10/2003 | Ozeki |
| 6,850,709 B1 | 2/2005 | Gfeller |
| 7,343,164 B2 | 3/2008 | Kallstenius |
| 7,715,723 B2 | 5/2010 | Kagawa et al. |

(Continued)

OTHER PUBLICATIONS

International Search Report and Written Opinion issued in corresponding International Application No. PCT/US2020/020748 dated Jul. 17, 2020.

(Continued)

*Primary Examiner* — David C Payne
*Assistant Examiner* — Pranesh K Barua
(74) *Attorney, Agent, or Firm* — Morgan, Lewis & Bockius LLP

(57) ABSTRACT

A self-organizing network of nodes communicates with uncollimated optical pulses. The nodes use low-power, unmoving, broad-beam optical interfaces, low-power processors, and communication algorithms based on timeslots within a timeframe. Nodes self-organize to form the network by pulsing detectors and sources to find neighboring nodes, confirm connections, transmit and store data, and exchange partner node identities. Two- or three-dimensional networks can thereby self-organize without external awareness of network topology, and can repair themselves when nodes move or fail. Node communication may be synchronous, thereby allowing for images of the environment status, and activation of the environment is possible via node stimulators. After forming a network, a cluster of nodes may be read out to provide data from node sensors. Implementation of selected features in the nodes' processors enable formation of networks that are unidirectional, bidirectional, serial, or complex including the formation of meshed networks with adjustable link weights capable of computation.

23 Claims, 18 Drawing Sheets

(56) References Cited

U.S. PATENT DOCUMENTS

| | | | |
|---|---|---|---|
| 7,925,167 B1 | 4/2011 | Kozubal et al. | |
| 9,270,372 B2 | 2/2016 | Miniscalco | |
| 10,451,714 B2* | 10/2019 | Shintani | H04B 10/114 |
| 2002/0171898 A1* | 11/2002 | Patton | H04W 99/00 |
| | | | 398/121 |
| 2004/0198453 A1 | 10/2004 | Cutrer | |
| 2005/0047386 A1* | 3/2005 | Yi | H04W 68/025 |
| | | | 370/345 |
| 2009/0168703 A1* | 7/2009 | Pandey | H04W 8/005 |
| | | | 370/329 |
| 2009/0214216 A1* | 8/2009 | Miniscalco | H04B 7/18504 |
| | | | 398/89 |
| 2010/0135168 A1* | 6/2010 | Chen | H04L 67/1046 |
| | | | 370/252 |
| 2010/0176939 A1* | 7/2010 | Harres | H04B 10/1149 |
| | | | 340/539.1 |
| 2010/0226645 A1* | 9/2010 | van der Wateren | |
| | | | H04W 56/002 |
| | | | 398/25 |
| 2010/0310258 A1* | 12/2010 | Wang | H04Q 11/0062 |
| | | | 398/115 |
| 2011/0007672 A1* | 1/2011 | Park | H04W 16/14 |
| | | | 370/280 |
| 2011/0170872 A1* | 7/2011 | Shin | H04L 7/0075 |
| | | | 398/78 |
| 2011/0286325 A1* | 11/2011 | Jalali | H04B 7/18589 |
| | | | 370/221 |
| 2012/0008959 A1* | 1/2012 | Son | H04B 10/1149 |
| | | | 398/99 |
| 2014/0241732 A1* | 8/2014 | Ishida | H04B 10/66 |
| | | | 398/130 |
| 2014/0376914 A1* | 12/2014 | Miniscalco | H04B 7/18504 |
| | | | 398/58 |
| 2015/0139198 A1* | 5/2015 | Hwang | H04W 72/042 |
| | | | 370/336 |
| 2015/0264711 A1* | 9/2015 | Lampin | H04W 72/06 |
| | | | 370/336 |
| 2016/0073355 A1* | 3/2016 | Yamauchi | H04B 17/27 |
| | | | 370/329 |
| 2016/0165557 A1* | 6/2016 | Alexander | H04B 1/7156 |
| | | | 370/350 |
| 2016/0191854 A1* | 6/2016 | Gonzalez-Banos | G01D 1/00 |
| | | | 702/150 |
| 2016/0316443 A1* | 10/2016 | Otomo | H04W 52/028 |
| 2016/0323839 A1* | 11/2016 | Davis | H04L 45/72 |
| 2017/0223604 A1 | 8/2017 | Skillermark et al. | |
| 2017/0245132 A1* | 8/2017 | Tsuchie | H04B 17/318 |
| 2017/0257167 A1* | 9/2017 | Adams | H04B 10/1143 |
| 2018/0368048 A1* | 12/2018 | Tsuchie | H04W 40/246 |
| 2019/0045483 A1* | 2/2019 | Tabet | H04W 56/001 |
| 2019/0356466 A1* | 11/2019 | Kratz | H04L 7/08 |
| 2019/0363927 A1* | 11/2019 | Ganeriwal | H04L 43/0811 |

OTHER PUBLICATIONS

Sugianto Trisno et al., "Theoretical and Experimental Characterization of Omnidirectional Optical Links for Free Space Optical Communications," IEEE MILCOM 2004. Military Communications Conference, 2004, Monterey, CA, US 2004, pp. 1151-1157 vol. 3.

* cited by examiner

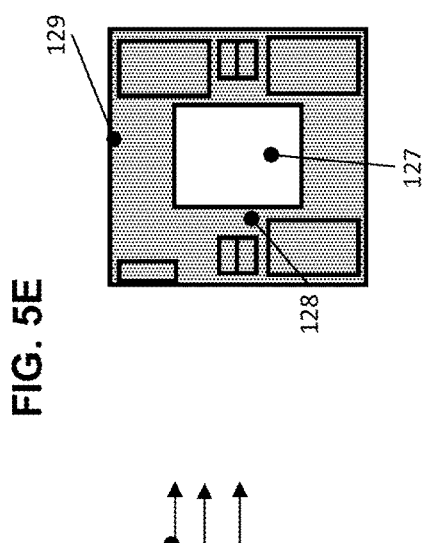
FIG. 5B
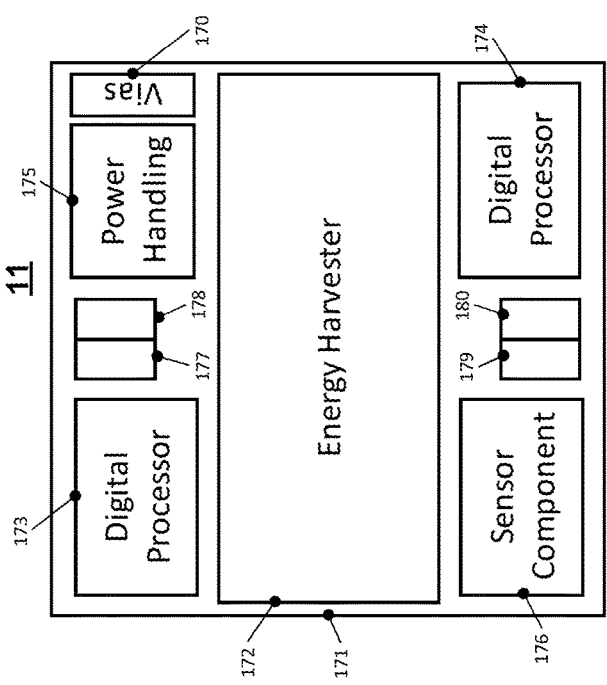
FIG. 5A
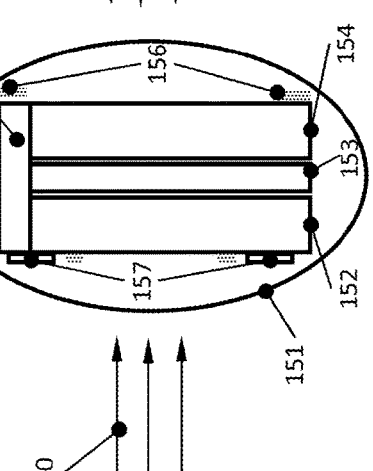
FIG. 5E
FIG. 5D
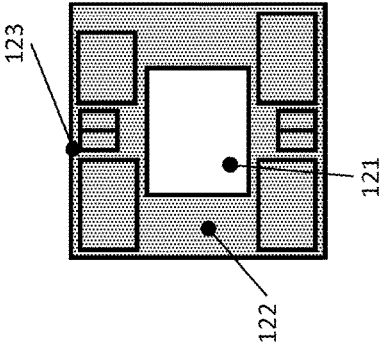
FIG. 5C

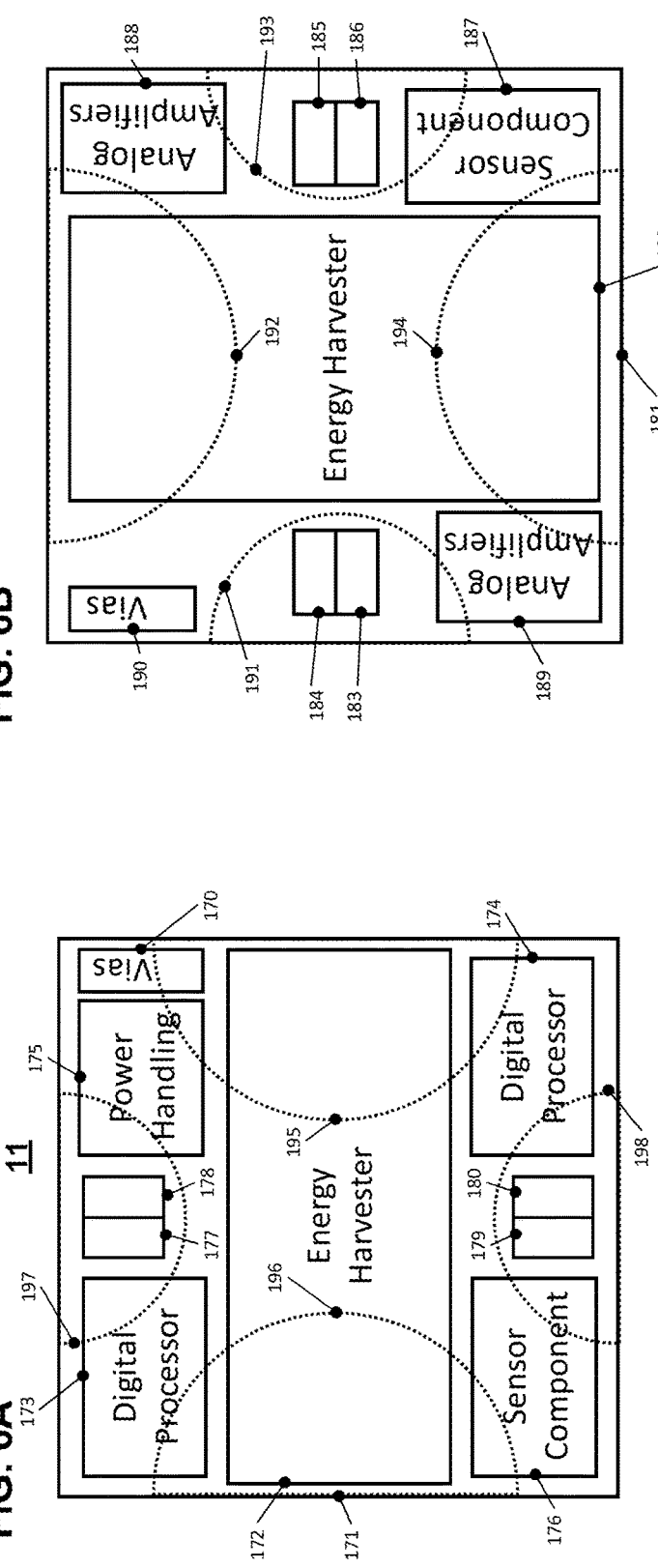
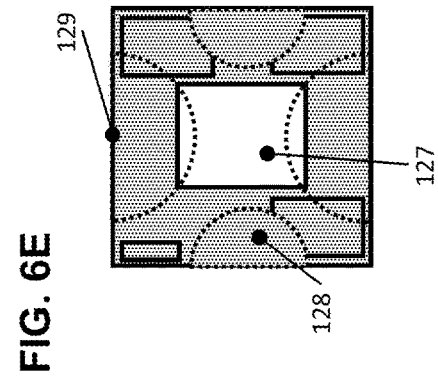
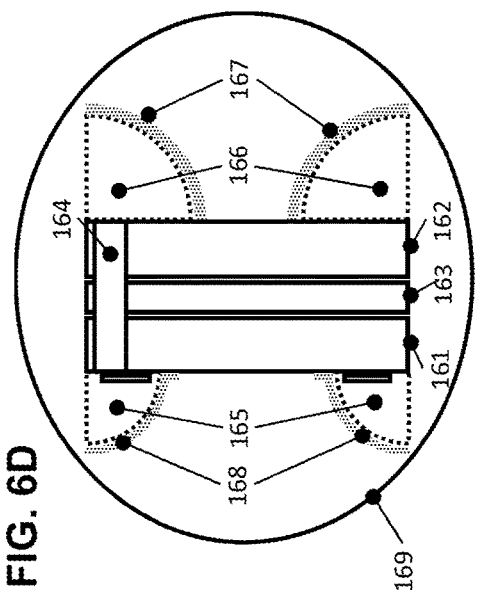
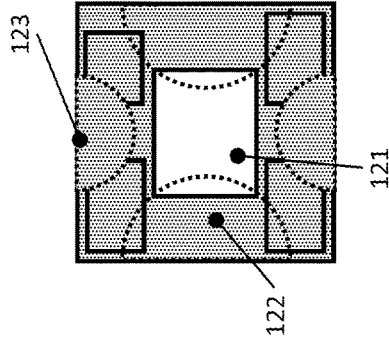
FIG. 6A
FIG. 6B
FIG. 6C
FIG. 6D
FIG. 6E

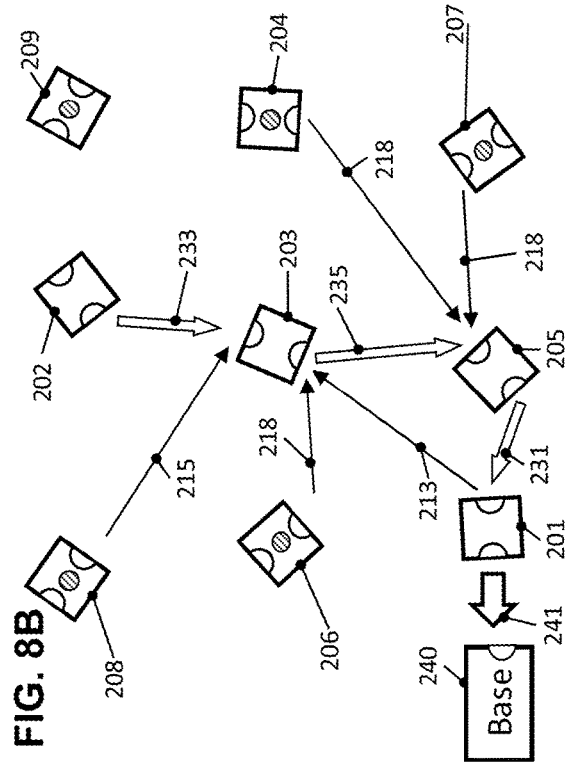
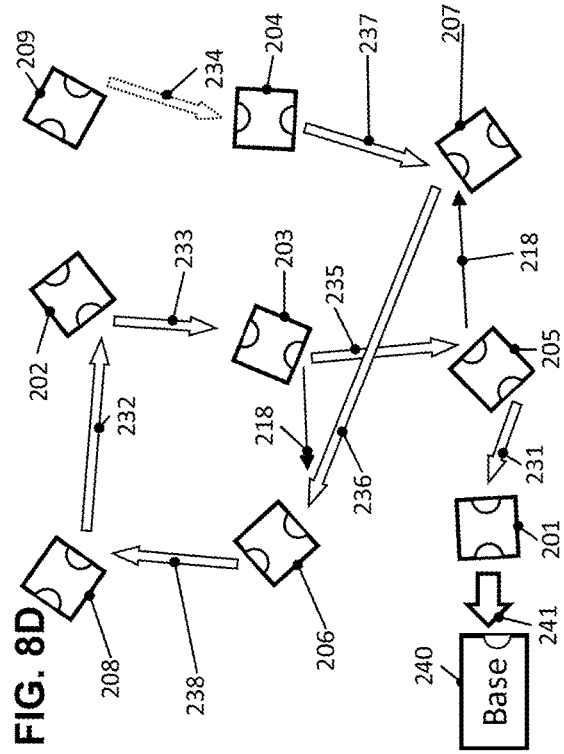
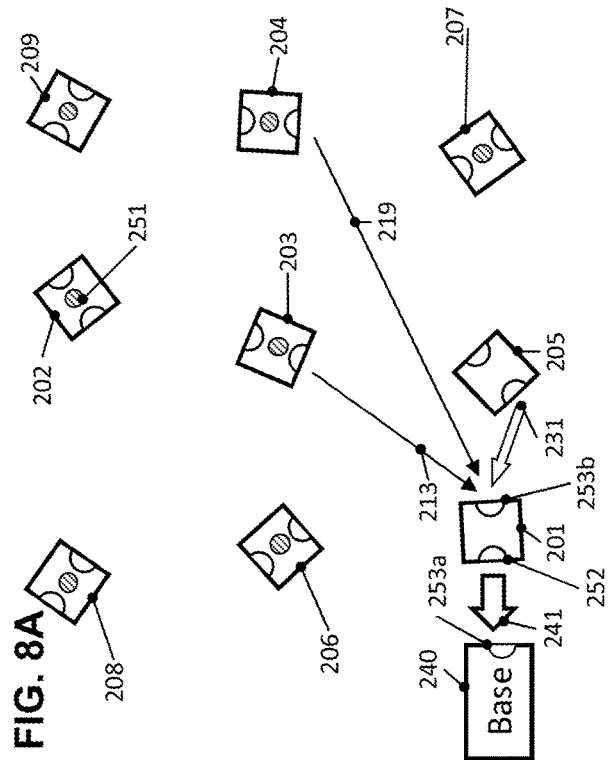
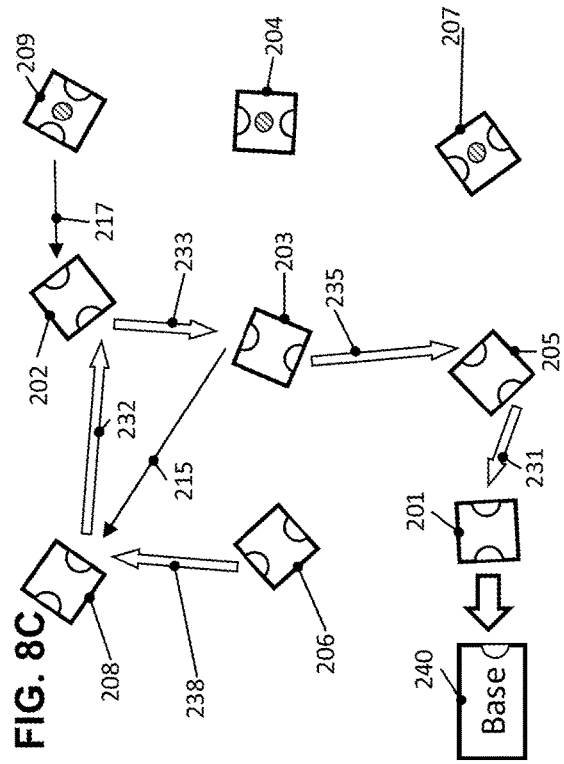

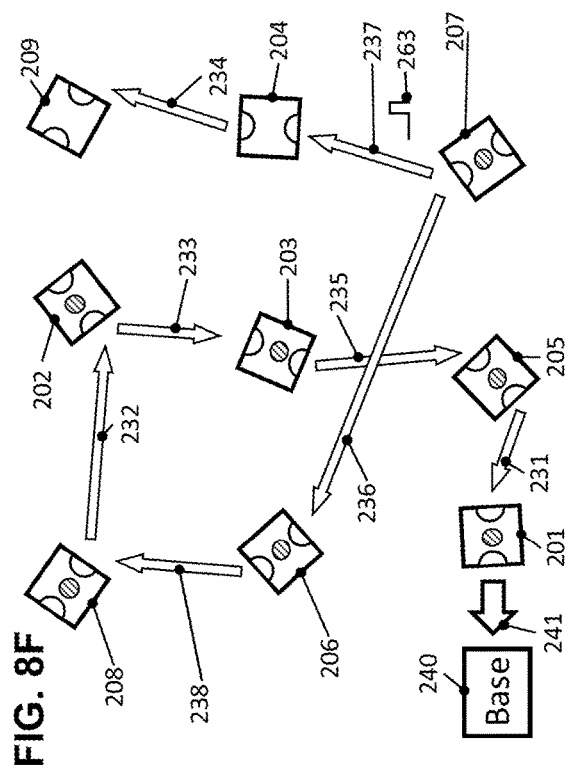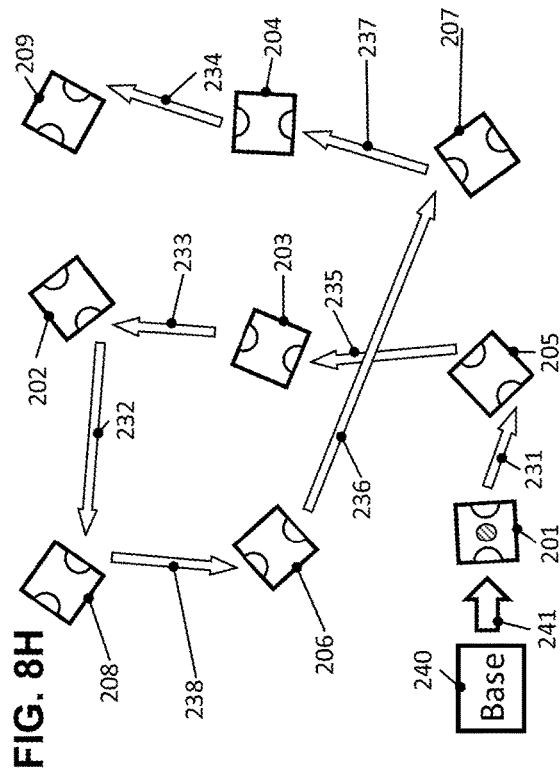
FIG. 8E  FIG. 8F  FIG. 8G  FIG. 8H

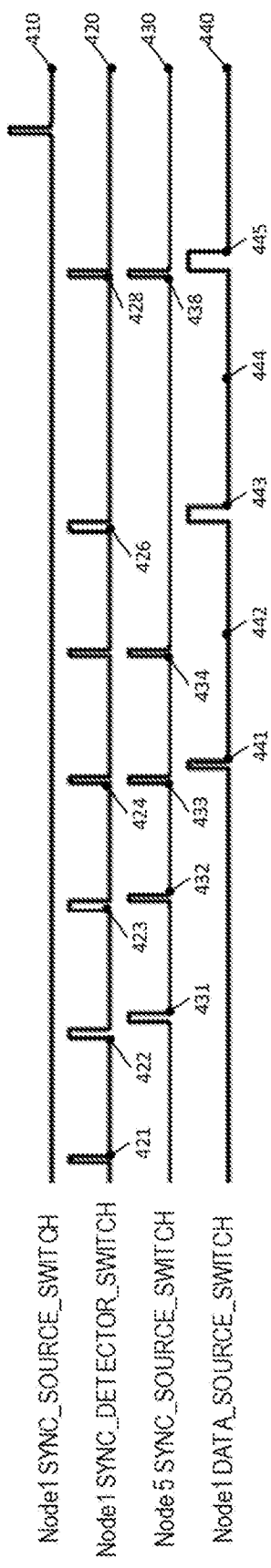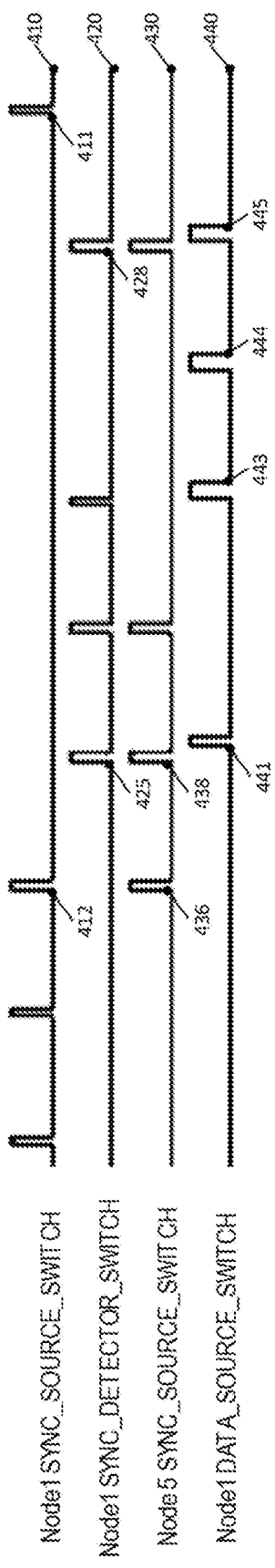

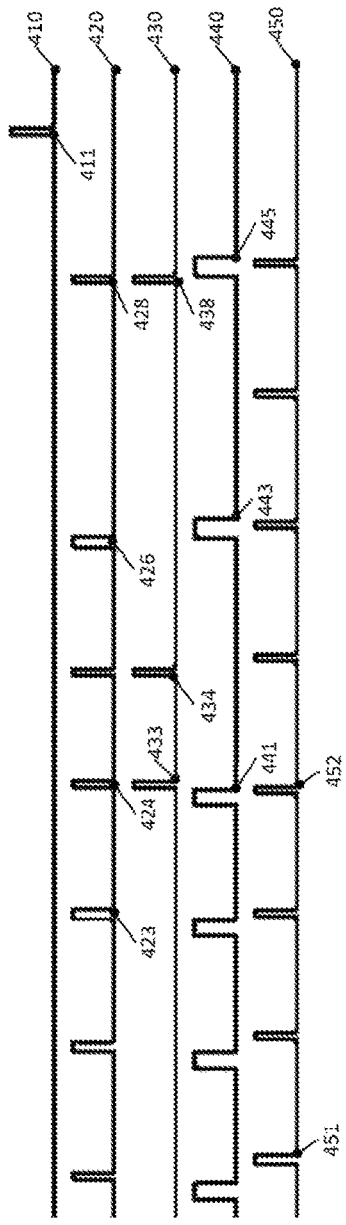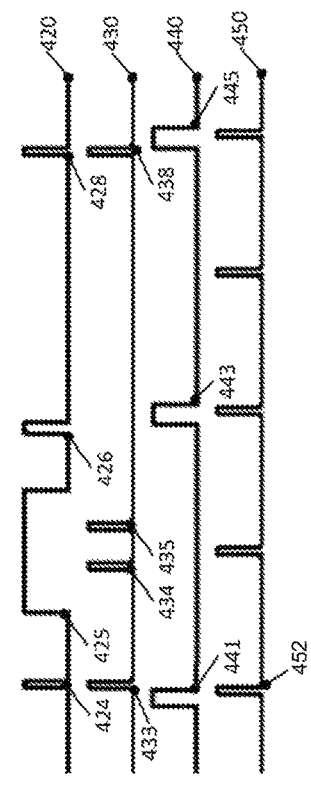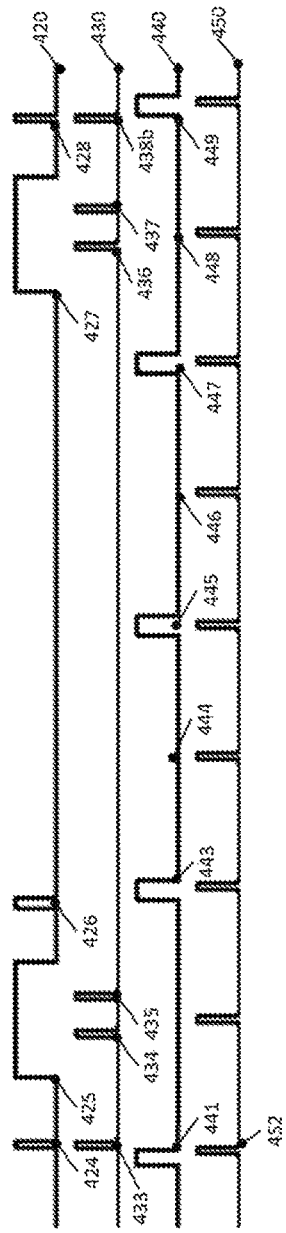

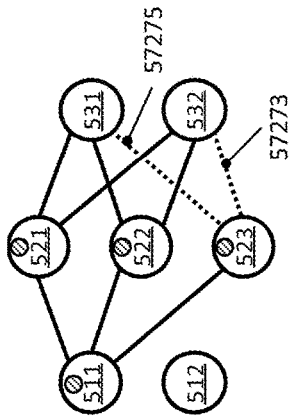
FIG. 11C
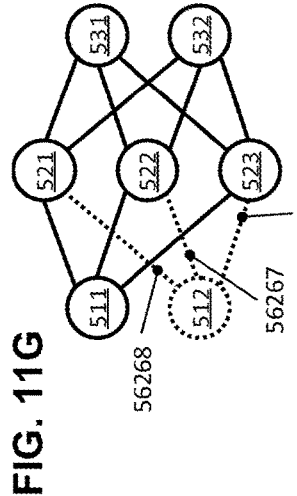
FIG. 11D
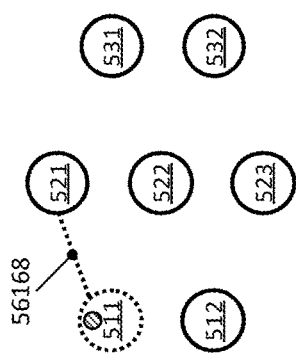
FIG. 11E
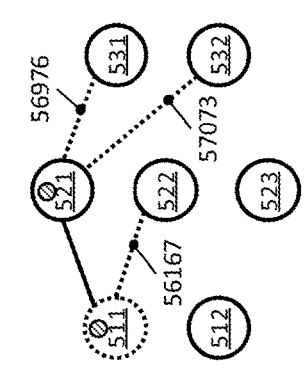
FIG. 11F
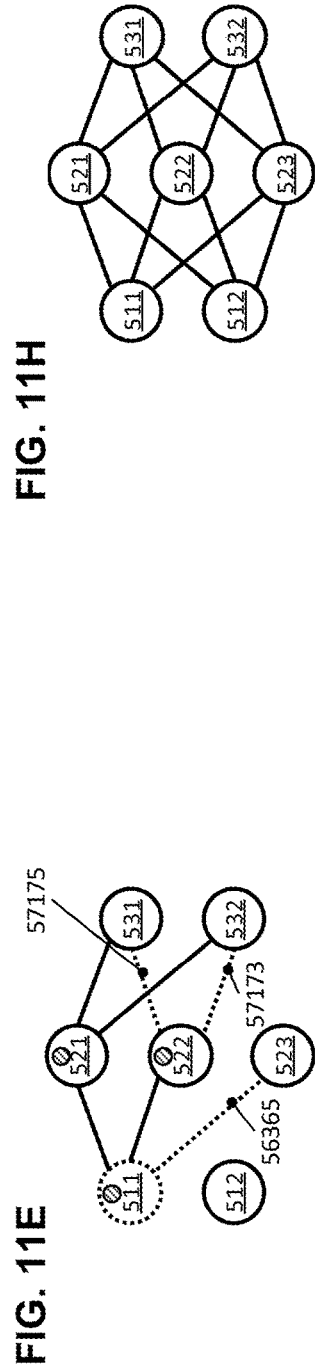
FIG. 11G
FIG. 11H

MINIATURE EMBEDDED SELF-ORGANIZED OPTICAL NETWORK

STATEMENT REGARDING FEDERALLY SPONSORED RESEARCH OR DEVELOPMENT

This invention was made with government support under contract number W81XWH-17-C-0003 awarded by the United States Army. The government has certain rights to the invention.

TECHNICAL FIELD

The present subject matter relates to equipment and operation techniques for implementing optical networks, including self-organized optical networks and computational/neural optical networks.

BACKGROUND

Wireless sensor networks using radio frequency (RF) are used to connect sensors and to thereby readout the moment to moment status of a region of interest such as a volcano surface, rainforest, or battlefield in which sensor nodes are distributed. Free space optical (FSO) networks are another network system which uses optical beams rather than radio-frequency for communications. In addition to using different RF and optical communication techniques for data transport, the networks have different use cases which inform differences in design. Each communication from a node, such as a building or a ship, in an FSO system may contain unique essential information. Free space optical is typically used for communication and thus sends larger data packets with higher quality of service than sensor networks. Wireless sensor networks (WSN) generally send small data messages related to simple signals from their onboard sensors, as such nodes may have a lower quality of service and maintaining low power consumption is a key factor. Each node might be placed in an environment to monitor temperature, rainfall, motion, seismic activity or other signals. WSN nodes typically provide similar information, such as temperature, to neighboring nodes and the loss of one node is not critical. While the data may be simplistic, in some use cases a WSN provides an image of the environment status at a specific time, and timing may be critical.

Applying free space optical communication methods to wireless sensor networks is challenging given the typically large cost, complex optics, and high-power consumption of FSO network equipment which cannot readily be used to replace light weight, high node count, and battery-powered WSN equipment. To address these deficiencies, a miniature networked system is presented herein that uses an optical physical layer with simpler broad beam designs to provide low power and space efficient design.

SUMMARY

The teachings herein alleviate one or more of the above noted problems with wireless network technologies.

In accordance with various aspects of the disclosure, a node configured for broad-beam optical communication with other nodes forming a wireless optical network includes a substrate having a main surface, first and second broad-beam optical interfaces, and a processor. The first and second broad-beam optical interfaces are disposed on the main surface of the substrate, and each is configured to receive and transmit broad-beam optical signals for optical communication with the other nodes. The processor is communicatively connected to the first and second optical interfaces and is configured to process the optical signals received and transmitted via the first and second optical interfaces. Each of the first and second optical interfaces includes an optical emitter configured to transmit broad-beam uncollimated optical signals therefrom, and an optical receiver configured to receive broad-beam uncollimated optical signals therethrough.

The first and second optical interfaces may both be immovable relative to the substrate.

The first and second optical interfaces may be configured to receive optical signals from different respective directions that are opposite relative to each other, and may be configured to transmit optical signals in the different respective directions.

The node may further include third and fourth broad-beam optical interfaces disposed on the main surface of the substrate, and each configured to receive and transmit broad-beam optical signals for optical communication with the other nodes. The third and fourth optical interfaces may be configured to receive optical signals from different respective directions that are opposite relative to each other and orthogonal to the respective directions of the first and second optical interfaces, and may be configured to transmit optical signals in the different respective directions.

The node may further include third and fourth broad-beam optical interfaces mounted to a second surface of the substrate opposite to the main surface, and each configured to receive and transmit broad-beam optical signals for optical communication with the other nodes.

The node may further include a secondary substrate mounted to the second surface of the substrate, and including one or more vias extending through the secondary substrate to connect to the processor. The third and fourth optical interfaces may be disposed on a main surface of the secondary substrate that faces away from the substrate, and may be electrically connected to the processor through the one or more vias.

The node may further include first and second microlenses disposed on the main surface of the substrate at locations aligned with the first and second optical interfaces, respectively, and each configured to reflect broad-beam optical signals transmitted by the other nodes towards the first and second optical interfaces and to reflect broad-beam optical signals transmitted by the first and second optical interfaces towards the other nodes.

The node may further include an energy harvester disposed on the main surface of the substrate and configured to harvest energy for operation of the node; and a reflective coating disposed on portions of the main surface of the substrate other than the energy harvester and the first and second optical interfaces, and configured to reflect light and optical signals incident thereon.

The substrate may be a translucent or transparent substrate, and the first optical interface may be configured to receive and transmit broad-beam optical signals propagating through the translucent or transparent substrate.

The node may further include a reflective coating disposed on portions of the main surface of the substrate facing the first optical interface, and configured to reflect light and optical signals incident thereon. The first optical interface may be configured to receive broad-beam optical signals impingent on a second surface of the substrate opposite to the main surface.

In accordance with other aspects of the disclosure, a self-organized optical network includes a plurality of optical nodes each configured for optical communication with other optical nodes of the self-organized optical network, and a base unit configured for optical communication with optical nodes of the self-organized optical network, and for communication with a computer external to the network. Each optical node of the plurality of nodes is assigned a different respective timeslot for communication with the other optical nodes of the self-organized optical network, and each optical node is configured to select a transmitting partner node by performing steps of transmitting an optical synchronization signal during each timeslot, monitoring for an optical response signal to each transmitted optical synchronization signal, and selecting as the transmitting partner node another optical node from which the optical response signal is received.

The timeslots may be ordered, and each optical node may be configured to select as the transmitting partner node an optical node having the lowest timeslot from among other optical nodes from which the optical response signal is received.

The timeslots may be ordered within a repeating cluster frame of the optical network, and each optical node may be configured to transmit the optical synchronization signal during each timeslot of a plurality of cluster frames, monitor for the optical response signal to each transmitted optical synchronization signal over the plurality of cluster frames, and select as the transmitting partner node another optical node from which the optical response signal is reliably received over the plurality of cluster frames.

Each optical node may be operative to store a data element, and each optical node may be configured to operate in a transmit mode of operation when the optical node stores the data element, and to transmit the data element during the optical node's assigned respective timeslot when operating in the transmit mode.

Each optical node may be configured to operate in a receive mode of operation when the optical node does not store the data element, and to monitor for transmission of a data element from the selected transmitting partner node during the selected transmitting partner node's assigned respective timeslot when operating in the receive mode.

The base unit may be configured to trigger the plurality of optical nodes of the optical network to operate in a write mode of operation in which data received from the base unit is propagated through the plurality of optical nodes, and each node may be configured to operate in the write mode of operation and to transmit a data element during the selected transmitting partner node's assigned respective timeslot when operating in the write mode.

Each optical node of the plurality of optical nodes may be configured to select a single transmitting partner node as part of forming the self-organized optical network.

The plurality of optical nodes may be each configured to transmit broad-beam uncollimated light for optical communication with the other optical nodes of the self-organized optical network.

Each optical node of the plurality of optical nodes may be configured for optical communication with other optical nodes disposed in three different orthogonal directions from the optical node.

Each optical node may be configured to receive, from one or more other optical nodes of the self-organized optical network, a data element, to transform the received data element according to a weight or bias, and to transmit the transformed data element to one or more other optical nodes of the computational network or to the base unit.

The base unit may be further configured to trigger the plurality of optical nodes to operate in a write mode of operation in which data received from the base unit is propagated through the plurality of optical nodes and used to change the weight or bias applied by the optical nodes to received data elements.

At least one optical node of the plurality of optical nodes may be configured to receive optical communications including data elements from a first plurality of the optical nodes, and to transmit optical communications including the transformed data elements to a second plurality of the optical nodes different from the first plurality.

At least one optical node of the plurality of optical nodes may include a sensor component, and the at least one optical node may be configured to transmit a data element including data received from the sensor component to other optical nodes of the plurality of optical nodes.

In accordance with further aspects of the disclosure, a method of operating a node configured for optical communication with other nodes of an optical network includes searching for a transmitting partner node from among nodes of the optical network. The searching includes performing steps of: transmitting, using an optical interface of the node configured to receive and transmit broad-beam optical signals for optical communication with the other nodes, an optical synchronization signal during subsequent timeslots of a cluster frame of the optical network; determining, following each transmission of the optical synchronization signal during subsequent timeslots of the cluster frame, whether an optical response signal is received at the optical interface from another optical node; and in response to determining that the optical response signal is received, selecting as the transmitting partner node the other optical node from which the optical response signal is received and storing the timeslot of the cluster frame associated with the transmitted optical synchronization signal.

The node may include first and second broad-beam optical interfaces each configured to receive and transmit broad-beam uncollimated optical signals in different directions from each other, and the transmitting of the optical synchronization signal may include transmitting the optical synchronization signal in each of the different directions using both the first and the second broad-beam optical interfaces.

The method may further include, in response to selecting the other optical node as the transmitting partner node, transmitting, during the stored timeslot of subsequent cluster frames, an optical synchronization transmission; determining, following each transmission of the optical synchronization transmission, whether an optical response signal is received at the optical interface from the transmitting partner node; and in response to determining that the optical synchronization transmission is received, receiving, during the stored timeslot of the subsequent cluster frame, a data element from the transmitting partner node.

The optical synchronization transmission may be transmitted only during the stored timeslot from among all timeslots of a subsequent cluster frame.

The optical synchronization transmission may be transmitted only when the node does not store any data element for transmission on the optical network.

The method may further include storing a data element for transmission on the optical network; and in response to storing the data element, performing steps of: monitoring, during a timeslot associated with the node in each cluster frame, for an optical synchronization transmission received at the optical interface from a receiving partner node; in response to determining that the optical synchronization transmission is received from the receiving partner node, transmitting the data element to the receiving partner node during the timeslot associated with the node in subsequent cluster frames; and following transmission of the data element, delete the data element.

The node may be further configured to obtain as the data element a measurement from a sensor of the node, and to transmit the measurement to the receiving partner node during the timeslot associated with the node.

The node may be configured to select only one transmitting partner node as part of forming the optical network.

The node may be configured to receive, from one or more other nodes of the optical network, a data element, to transform the received data element according to a weight or bias value, and to transmit the transformed data element to one or more other nodes of the optical network.

The node may be further configured to receive, through the optical network, the weight or bias value, and to apply the received weight or bias value to received data elements.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 5A-5E are diagrams of various embodiments of optical nodes configured for use in self-organized optical networks;

FIGS. 6A-6E are diagrams of various embodiments of optical nodes configured for use in self-organized optical networks;

FIGS. 8A-8H are network diagrams showing an illustrative self-organized optical network and communication functions thereof;

FIGS. 10A-10E are timing diagrams showing functioning of optical nodes configured for use in self-organized optical networks under various operating modes;

DETAILED DESCRIPTION

Figure 1:
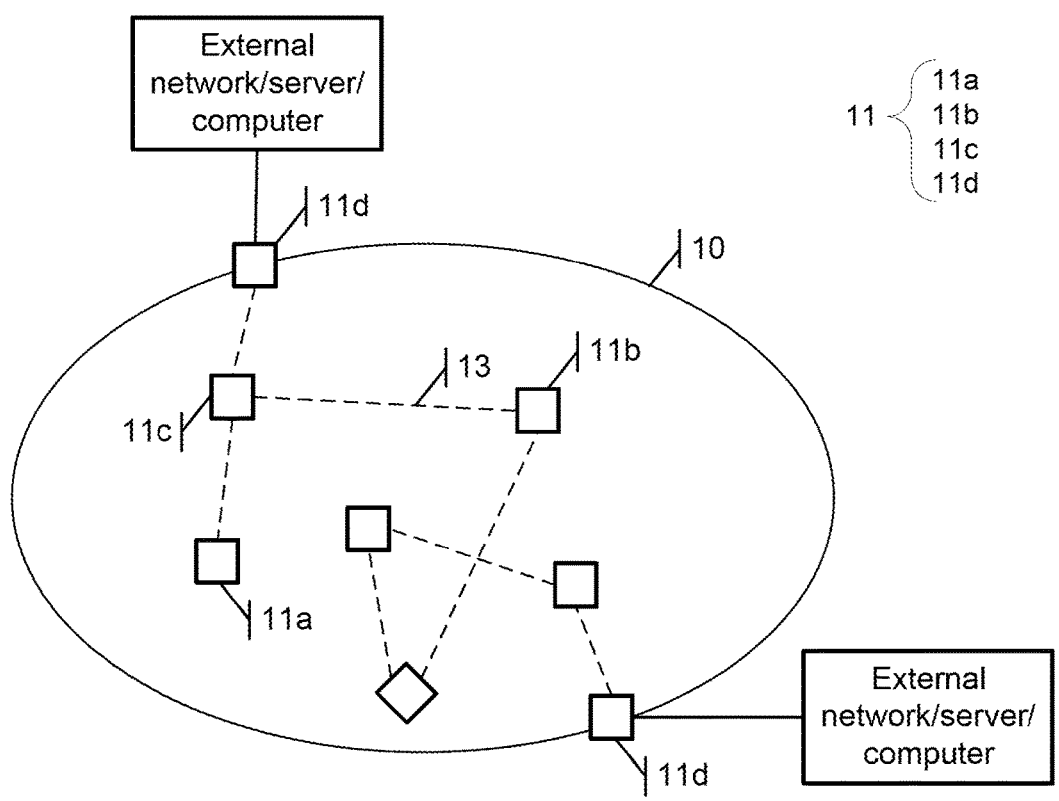
FIG. 1 is a network diagram of an illustrative self-organized optical network.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various equipment and methods disclosed herein relate to optical networks and components thereof, including to the formation and function of self-organized optical networks and computational/neural optical networks using optical network nodes.

Prior to describing the disclosure of the present invention, several terms and concepts will be presented. The term node refers to the physical hardware circuitry and individual components used to form the network. The individual nodes form a network within a cluster of nodes. Multiple clusters of nodes may exist in an environment as region networks. The clusters can communicate via repeater nodes. Repeater nodes are nodes which simply repeat any flash of light incident on them to extend the reach of nodes. The term cluster frame refers to the length of time that encompasses the number of pulses used to transfer data, with each pulse being a fixed number of master clocks pulses. The cluster frame is periodically repeated during function of the networks and nodes/components thereof. The term timeslot refers a pulse number of the given set of pulses that comprises the cluster frame. A reset frame is the number of frames before the node will reset the value of the data stored within its memory. Microchip refers to microfabricated semiconductor chips as well as small printed circuit boards. Activators refers to components which release electrical, optical, piezoelectric or thermal energy into the local environment. A simple computational or neural network is a network of nodes which can send data forward between layers of nodes, modify the data based on values termed weights, and output signals from the final layer which indicate the processed solution to the input data. Furthermore, it may be desirable for the output solution to inform changes or modifications to nodes' weights, on occasion, to improve the solutions output. Reference now is made in detail to the examples illustrated in the accompanying drawings and discussed below. Embodiments of the disclosure will be described in detail. For all the drawing figures like reference numerals identify similar or identical elements.

Referring to FIG. 1, a self-organized optical network 10 includes a plurality of nodes 11 distributed in an environment. The nodes may be located in a natural environment, such as the ocean, the atmosphere or a biologic tissue, or a fabricated environment such as a transparent solid, 3D printed tissue, or structural housing. The environment may fixedly hold the nodes 11 in place such that they maintain static positional relationships relative to each other. Alternatively, the environment may allow for movement of the nodes relative to each other. In embodiments in which the nodes can move relative to each other, the nodes are capable of forming networks within that movement. In either case, the nodes are independent units which are configured to seek out and establish communication links with nearby neighbor nodes for communication and data transfer.

The nodes 11 of the network 10 establish communication links 13, illustratively shown as dashed lines in FIG. 1, between each other. The communication links 13 may be uni-directional communication links that allow for transfer of data in a single direction (e.g., from a particular node to a particular other node), or bi-directional communication links that allow for transfer of data in two directions between two nodes (e.g., to and from the two nodes). In embodiments in which the network 10 is an optical network, the communication links are optical links between nodes 11 and communication across the links takes the form of optical pulses propagation through the environment between the nodes 11.

As shown in FIG. 1, the network 10 includes a plurality of nodes 11 including one or more nodes 11*a* that each supports a single communication link, nodes 11*b* that each support two communication links, and/or nodes 11*c* that each support more than two communication links. The network 10 can additionally include one or more edge nodes 11*d* or base units that enable transfer of data into or out of the network 10. An edge node 11*d* or base unit is configured for communication with other nodes 11 of the network 10 (e.g., by establishing and communicating across communication links 13 of the network 10 with the other nodes 11), and is further configured for communication outside of the network 10 through a wired or wireless communication link. For example, an edge node 11*d* or base unit may provide a communication connection between the network 10 and an external network (e.g., a local area network (LAN), wide area network (WAN), the internet, or the like), between the network 10 and an external computer or server, or the like.

In one example, the network 10 may be a miniature networked system that includes ten or more nodes to fit within a cubic centimeter. Such nodes might sample a microenvironment for temperature variation, optical signal intensity variation, electrical potential changes, or other signals. The microenvironment might be in liquids, air, biological tissue, or other region with temporal and/or spatially varying signals. The nodes 11 of the network 10 may communicate between each other using optical signals to read out data from the environment to a base unit or edge node of the network 10. However, several critical challenges arise from using wide beam optics in a self-organizing network of small distributed nodes. The first concern is creating a low power processor and optical system capable of operating from a battery or energy harvested power. An additional concern is providing a networking protocol that can operate with optical beams incident on multiple nodes. Indeed, free space optical systems typically require that only one other optical receiver can detect the transmitted beam, and such a requirement may not be met by the network 10 in which significant crosstalk may occur between nodes provided with high density in the environment. To address these challenges, the node equipment and communication methods detailed below may be used.

Figure 2B:
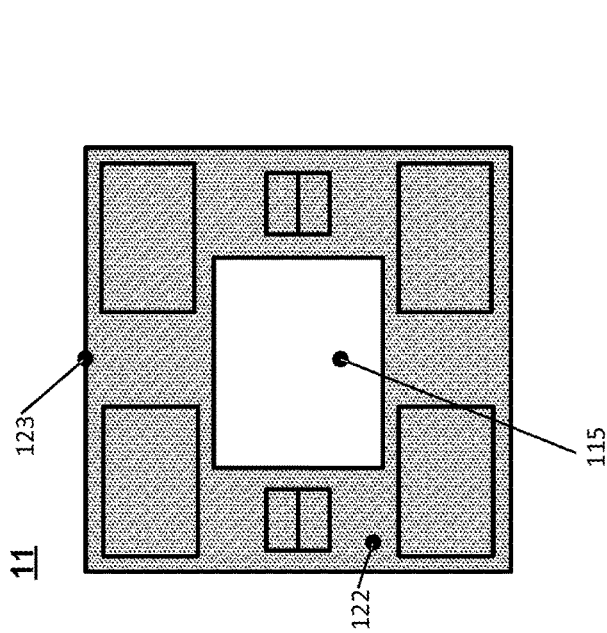
FIGS. 2A-2D are diagrams of various embodiments of optical nodes configured for use in self-organized optical networks.
Figure 2C:
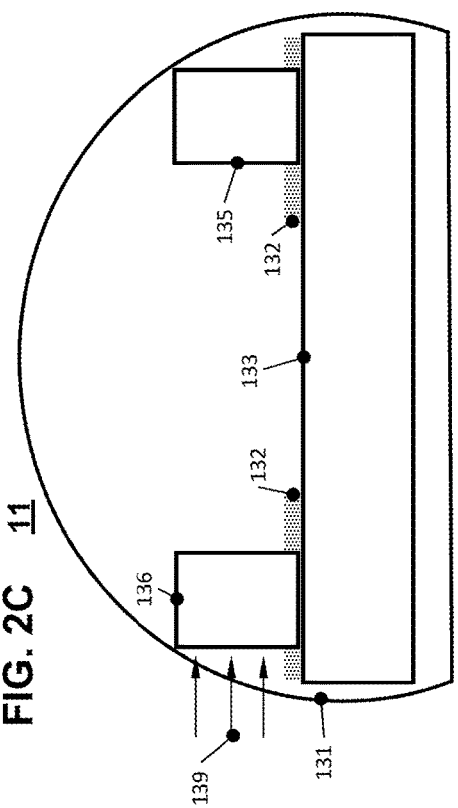
Figure 2A:
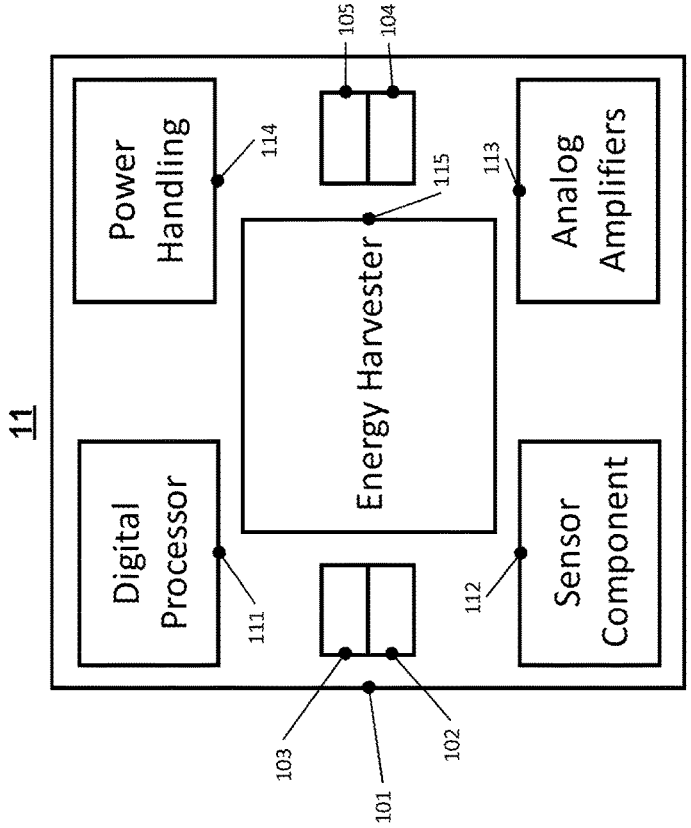

FIGS. 2A-2C show detailed views of an illustrative node 11 of the network 10. Referring to FIG. 2A, a microchip 101 forms the basis of the hardware the node 11. In a typical embodiment, all of the hardware components of the node 11 are integrated on a single microchip; alternatively, a node 11 may include multiple microchips directly mounted to each other or mounted to a same circuit board. Each node includes a processor 111 (e.g., digital processor), one or more optical interfaces 102-105, analog circuits 113 (e.g., analog amplifiers), an energy source 115 (e.g., a battery or energy harvester), and power handling circuits 114 integrated in or mounted to the microchip 101. The processor 111 is a hardware processor which executes machine-readable instructions stored therein or provided from outside to thereby perform various functions described herein. A sensor component 112 and/or an actuator is optionally provided in the node 11 in situations in which interaction with the local environment is desired. The processor 111 controls the communications of the node 11 with neighboring nodes of the network 10, controls the operation of the node 11 and components thereof and, for such purposes, stores data.

In a preferred embodiment, the nodes 11 communicate with each other using optical links. The optical communication links are provided via light emitting diodes (LEDs) 102 and 104 or other light emitting sources used for transmission of optical signals to neighboring nodes 11, and photodetectors 103, 105 used for reception of optical signals from neighboring nodes 11. The photodetectors 103, 105 may be photodiodes, phototransistors, or LEDs. In general, the light emitting sources or light emitting diodes (LEDs) 102 and 104 emit broad-beam and un-collimated light. For example, the LEDs 102, 104 may emit light in which light rays are not parallel, but are instead divergent so as to produce illumination that spreads as it propagates outwardly from the light source. In various examples, the LEDs 102, 104 produce an uncollimated output beam of light having a beam angle of 30 degrees, of 45 degrees, of 60 degrees, or of 90 degrees or more. In contrast, light sources usually used in FSO networks use collimated light, such as light emitted by laser sources, to provide a narrow beam of illumination that can be detected from a long distance. In certain embodiments, however, the light emitting sources or light emitting diodes (LEDs) 102 and 104 may alternatively emit collimated light.

The analog components 113 modify the signals from or signals sent to the optical interfaces 102-105 and any sensor components 112 and/or actuators. The sensor components 112 and/or actuators interact with the environment by acquiring signals from application specific sensors or affecting the environment with application specific actuators/activators via electrical, optical, piezoelectric, or thermal energy. The node 11 may be referenced as a sensor node or sensor component in implementations in which sensors and/or actuators/activators and circuits are provided in the node 11.

As the nodes are meant to be independent wireless units, a suitable energy source is usually provided in each node 11 in the form of an energy harvester 115. The energy harvester 113 provides the specific voltage or voltages used by the node's circuits and components through the power handling circuits 114. In some embodiments the energy harvester 115 is simply a battery or capacitor. In other embodiments the energy harvester 115 collects electromagnetic, chemical, or sound energy from the local environment to provide electrical power/energy for operation of the node 11. The energy may be ambient or actively generated and applied to the environment. In some embodiments, the applied energy may have a signal or other information embedded therein that is interpreted by the processor 111, such as a global clock signal. In one embodiment, the energy harvester 115 takes the form of a photovoltaic cell that harvests light energy from the environment for powering operation of the node 11.

In some embodiments, the optical interfaces 102-105 can provide two or more channels used for communication, synchronization, and data transmission. The optical interfaces 102-105 can optionally use different wavelengths for providing the different channels, for example by using different sets of LEDs and detectors emitting and sensing different wavelengths in the optical interfaces. Alternatively or additionally photodetectors capable of wavelength selection, color filters, or other approaches can be used to enable a same device to distinguish between different wavelengths/ channels. In this way, different wavelengths/channels can be used for synchronization, data transfer, and/or inhibition.

In certain implementations, optical energy incident on nodes 11 for energy harvesting and/or communications may disrupt the functioning of the processor 111 and other light sensitive circuits within the node 11. To prevent unwanted optical interaction with circuits of the node 11, an optically opaque coating may be applied. FIG. 2B shows a top view of an embodiment of a node 123 with a coating 122 applied to all top surfaces except the energy harvester 115. In one embodiment, the coating 122 takes the form of a reflective film formed of a material such as gold, platinum, silver. The coating allows for incident energy to be reflected to other adjacent/neighbor nodes for harvesting, for redirection of light onto optical interfaces (130, FIG. 3C), and for electrical shielding when connected to a circuit ground.

The environment in which the nodes 11 are located may have features which are damaging to the nodes 11. In such environments, the nodes 11 may be coated with an encapsulating material, shown in FIG. 2C. As an example, in cases in which nodes 11 are implanted in a biological tissue or distributed in an ocean, the saline environment may damage exposed circuits and components of the node 11. In such embodiments, the encapsulant 131 may cover the entire node 11 or may cover a portion of the node 11 while leaving open/exposed an electrode of the sensor component 112 or actuator.

As shown in the side view of FIG. 2C, the optical interfaces 135, 136 can be added to or mounted on a surface of the node's microchip 101, rather than being integrated into the microchip 101. The surface mounting of the optical interfaces 135, 136 can allow for the use of different materials for the node circuits and for the optical interfaces. For example, GaN LEDs could be used as a photodetector with a silicon processor circuit.

In some embodiments such as that shown in FIG. 2C, the optical interfaces 135, 136 are "side looking" to optimize detection of signals from more than one direction. The components 135, 136 are mounted such that the optimal light 139 gathering angle is 90 degrees from the normal vector of top surface of the microchip 133. In other embodiments, some of the optical interfaces, such as silicon photodiodes, may be integrated in to the microchip 133. The optical blocking coating 132 shown in FIG. 2C does not separate the optical interfaces 135, 136 from forming electrical contact with the microchip surface.

Figure 2D:
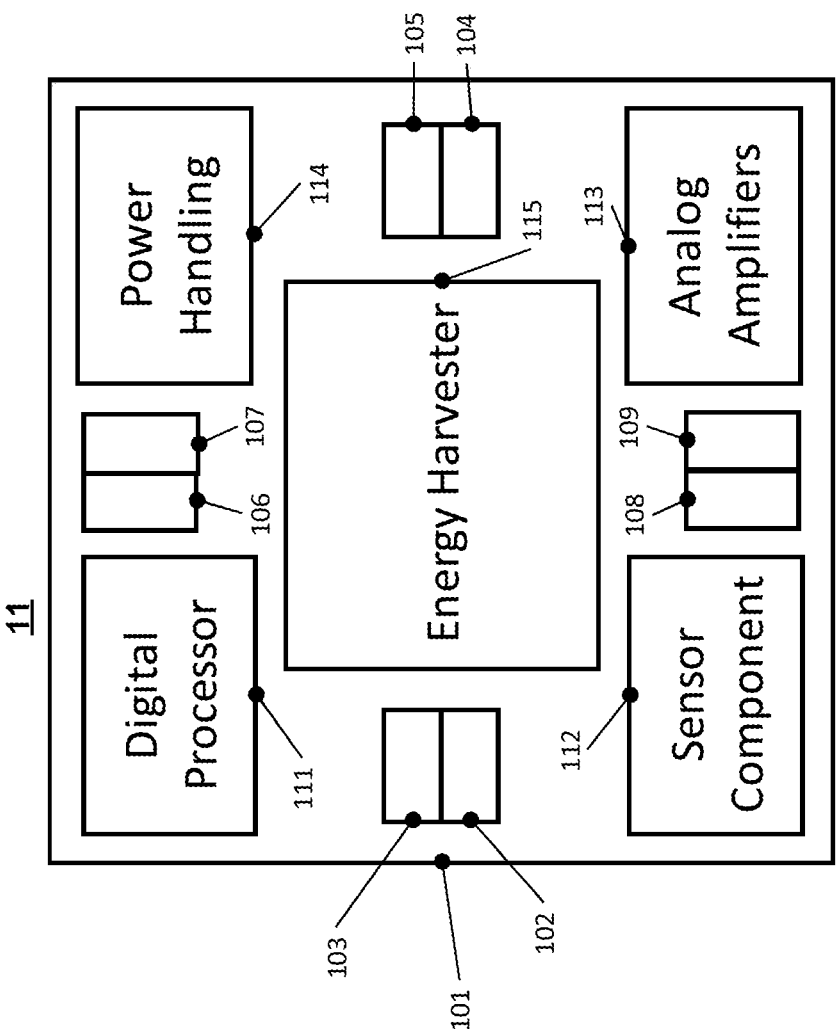

In the illustrative embodiment shown in FIG. 2A, the node 11 includes two groups of optical interfaces: a first group including optical interfaces 102 and 103, and a second group including optical interfaces 104 and 105. In other embodiments, different numbers of optical interfaces may be provided. For example, in a second illustrative embodiment shown in FIG. 2D, the node 11 includes four (4) groups of optical interfaces 102-109. By including multiple groups of optical interfaces, the node 11 provides more angles or orientations along which optical communication signals can be optimally transmitted and/or received. For instances, in the embodiment of FIG. 2D, communication can be sustained along each of the four sides of the node 11.

Figure 3C:
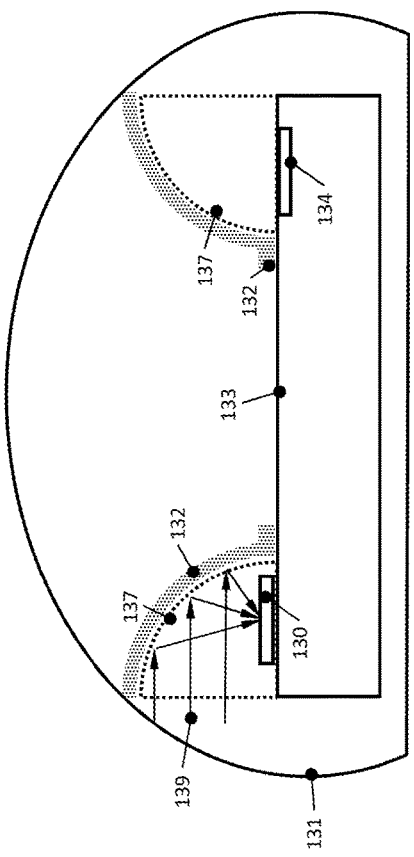
FIGS. 3A-3C are diagrams of various embodiments of optical nodes configured for use in self-organized optical networks.
Figure 3B:
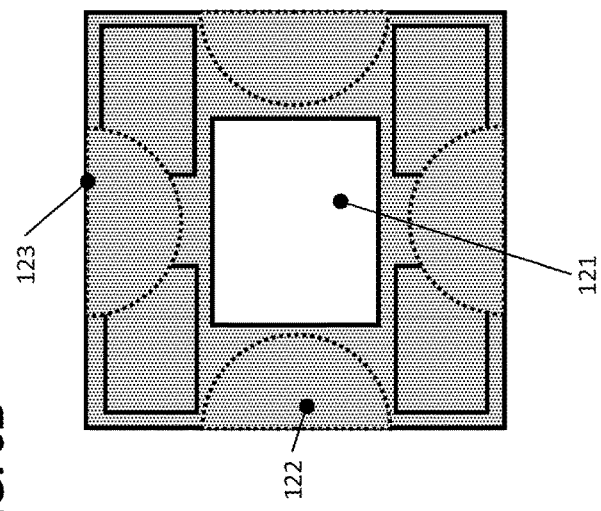
Figure 3A:
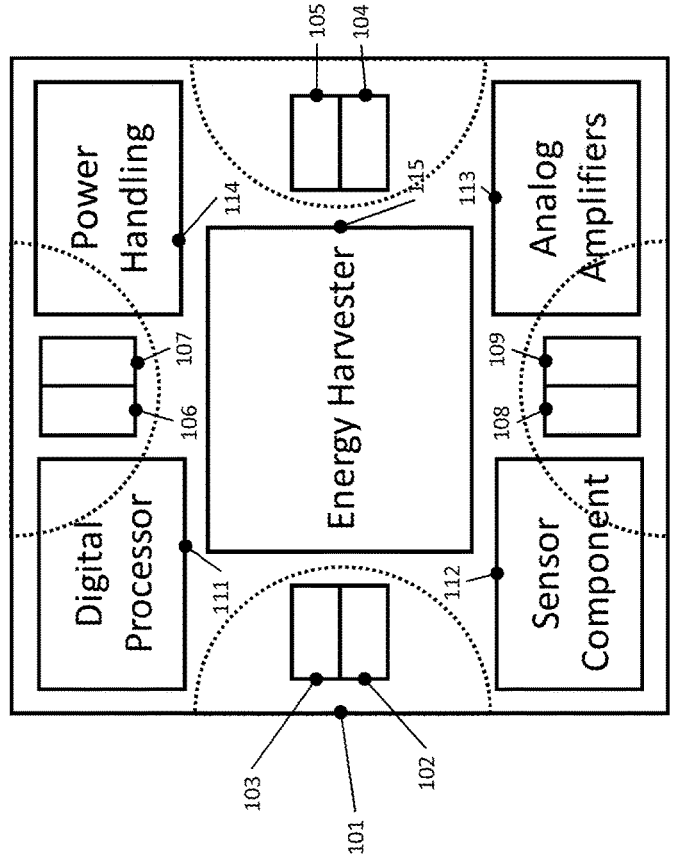

FIGS. 3A-3C show illustrative nodes 11 having optical interfaces with optimal angles of incidence perpendicular to a top surface of the microchip 101/133. As shown in FIG. 3A, the illustrative node includes four groups of optical interfaces 102-109. Additionally, as shown in the cross-sectional view of FIG. 3C, each of the optical interfaces 102-109 may each take the form of an integrated optical interface 134 which is integrated within the upper surface of the microchip 101/133, or of an optical interface mounted to the upper surface of the microchip 101/133. In the embodiment shown in FIGS. 3A-3C, the integrated optical interface 134 has an optimal angle of incidence perpendicular to the top surface of the microchip. Likewise, the optical interface 130 mounted as part of a post-processing step to the upper surface of the microchip 101/133 typically has an optimal angle of incidence or illumination in the same direction perpendicular to the top surface of the microchip. In the embodiment, a hemispherical microlens can be used to focus light onto the optical interface(s) 130/134 functioning as image sensors. For example, novel modified quarter-sphere microlenses with a cut edge can be used to direct light 90 degrees from incidence, as illustratively shown in FIG. 3C. Specifically, FIG. 3C shows how quarter-sphere microlenses 137 mounted on the upper surface of the microchip 133 can redirect incident light 139 towards the upward oriented optical interfaces 130, 134. As shown in FIGS. 3A-3C, multiple quarter-sphere microlenses may be placed over all of the optical interfaces 102-109, including optionally over sensor components 112. Each microlens may be oriented towards a direction in which optimal sensitivity is desired. The reflectivity of the quarter-sphere microlens is due to changes in the index of refraction between the lens and surrounding material. Additionally, the blocking material 122, 132 can be provided on an exterior surface of the lenses, where the use of reflective metals as the blocking material 122, 132 provide high reflection of incident and emitted light to or from optical interfaces.

Figure 4B:
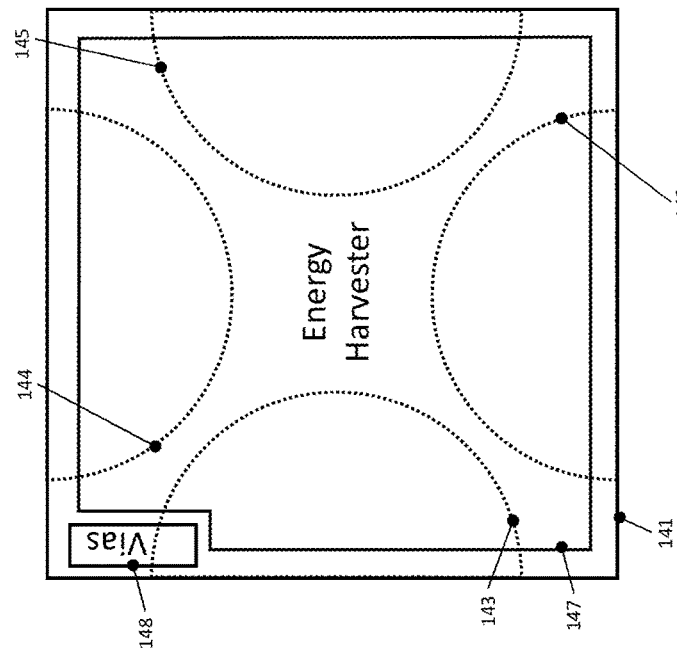
FIGS. 4A-4E are diagrams of various embodiments of optical nodes configured for use in self-organized optical networks.
Figure 4E:
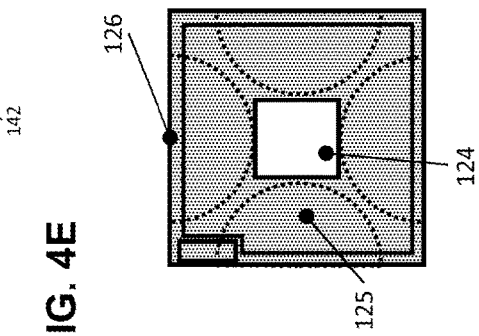
Figure 4D:
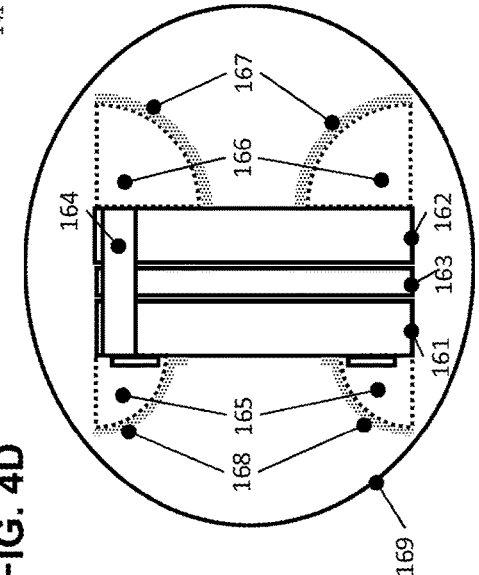
Figure 4A:
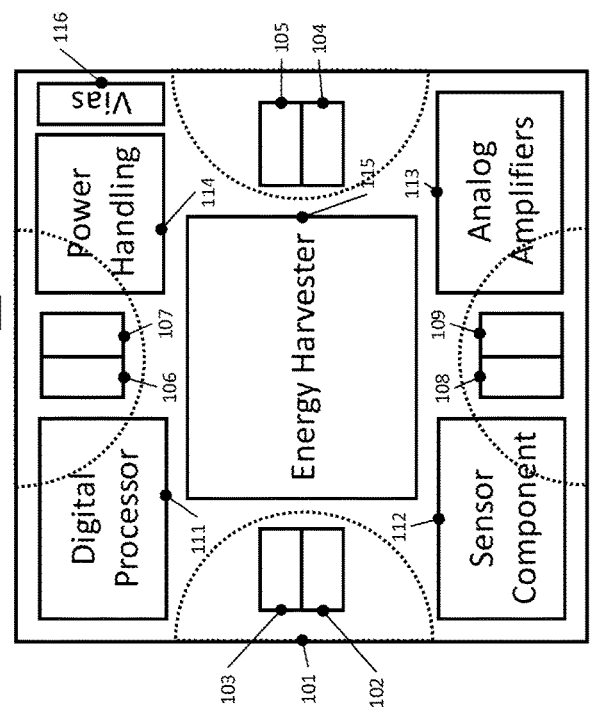
Figure 4C:
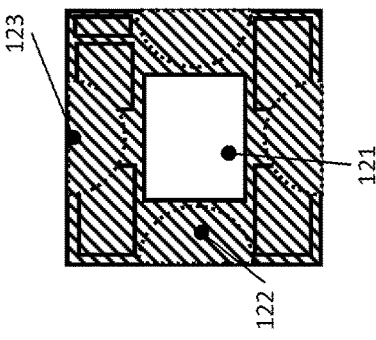

The foregoing description has focused on nodes 11 that include a single microchip 101/133, and that include optical interfaces 102-109 disposed on a same/single surface of the microchip 101/133. More generally, however, nodes 11 can include optical interfaces 102-109 on multiple surfaces thereof, for example to sustain communication links in a three-dimensional (e.g., non-planar) environment. For example, as shown in FIGS. 4A-4E, a node 11 can include two microchips 101/141 (FIGS. 4A-4B), 161/162 (FIG. 4D). The microchips can be stacked and use vias 116, 148, 164 to communicated with each other. An optional interposing chip 163 can further be used to connect the two microchips. The vias are conducting channels extending through microchips.

Through the use of two microchips, the node is provided with an increased surface area allowing for additional energy harvesting by the secondary microchip 141, 162, for example by using energy harvester 147. Any electrical energy provided by the energy harvester 147 can be transported to the primary chip 101, 161 through the vias 116, 148 and 164. Additionally or alternatively, quarter-sphere microlenses 142-145 can be provided on the secondary microchip 141, 162 to provide light gathering from different directions and to reflect the light incident from the different directions onto the energy harvester 147. The region of the energy harvester 147 that is not covered by any of the microlenses 142-145 allows light collection from a fifth direction (e.g., a direction orthogonal to the surface of the secondary microchip 141, 162 on which the energy harvester 147 is provided). In combination with the microlens on the primary microchip 101, the node can collect energy from all 6 sides and thereby increase the probability that the node will have sufficient operating power. The blocking material 168, 122 167 and 125 is optimally reflective and leaves open areas on both the primary 121 and secondary 124 surfaces for energy harvesting by energy harvesters 115 and 147.

In a further embodiment, a node 11 including multiple microchips is configured so as to provide the analog processing circuits on a microchip that is separate and distinct from a microchip including the digital processing circuitry. For example, as shown in FIGS. 5A-5B, analog circuits 188-189 are provided on the secondary microchip 181 so as to be separate from the digital processor 173 provided on the primary microchip 171. The node thereby provides a simplified design and manufacture of the device and allows changes in the analog circuits without affecting the existing digital processor. Also, the design allows for making changes in the digital processor without affecting existing analog circuits.

Additionally, in the illustrative embodiment shown in FIGS. 5A-5E, optical interfaces 177-180 and 183-186 are provided on both microchips 171/181 or 152/154 thereby providing surface oriented optical interfaces access to two directions 150, 159 of light incidence and/or emission without use of microlenses or side view optical interfaces.

In a further embodiment shown in FIGS. 6A-6E, the node additionally includes microlenses 191-198 disposed on surfaces of the microchips 171, 181, 161, and 162 to increase light gathering of the node in six directions. For example, microlenses 192 and 194-196 provide for improved light harvesting in six directions, while microlenses 191, 193, and 197-198 provide for improved sensitivity to signals emitted and transmitted in six directions. Blocking material 122, 128, 167 and 168 can be used to further enhance microlens reflection, while openings or windows 121, 127 in the blocking material allow light incident on the top and bottom surfaces of the node to provide energy.

As described above in relation to FIGS. 4A-4E, 5A-5E, and 6A-6E, nodes 11 can sense signals and harvest energy incident on opposite surfaces thereof by providing the nodes with multiple microchips mounted to each other. Alternatively, a node 11 may sense signals incident on a back surface thereof, and/or harvest energy incident on a back surface thereof, through a thinned backside substrate. In detail, backside illumination allows for greater design flexibility when fabricating microchips with optical sensors such as imaging chips used in nodes 11. Typically, a silicon microchip 101/133 is thinned as part of the microchip fabrication process, and the resulting thinned substrate is transparent or translucent and allows light to propagate therethrough. In accordance with the present disclosure, only the thinning step is used to thereby simplify the process.

Figure 7:
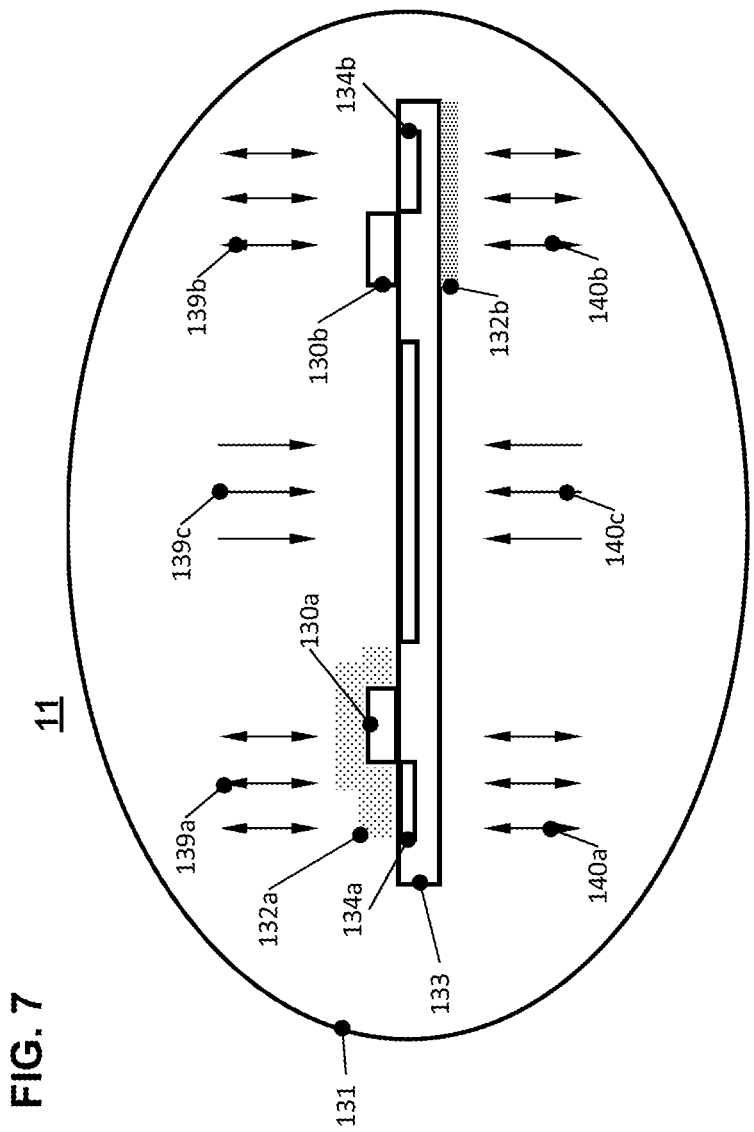
FIG. 7 is a diagram of an embodiment of an optical node configured for use in self-organized optical networks.

For example, as shown in FIG. 7, a node capable of backside illumination is configured for the collection and propagation of light from two directions with a single microchip device 133 without use of microlenses and/or sideview optical interfaces. With the thinned substrate enabling backside illumination to be sensed, light energy incident from both the front 139c and back 140c of the microchip 133 can be harvested by the energy harvester. In addition, optical interfaces 130a, 134a on the front of the chip are operative to detect light 140a incident on the chip substrate from the opposite/back side and propagating through the translucent or transparent chip substrate. Optionally, a blocking coating 132a prevents detection of light 139a incident from the frontside of the microchip or propagation of light 139a in the direction of the frontside by the optical interfaces 134a, 130a. A similar blocking coating 132b on the backside of the microchip 133 prevents detection or propagation of light 140b in the direction of the backside of the chip from optical interfaces 130b, 134b disposed on the frontside of the microchip 133. The optical interfaces 134a, 134b represent photodiodes, phototransistors, or LEDs integrated into the microchip 133. The optical interfaces 130a, 130b represent photodiodes, phototransistors, or LEDs attached or mounted to the front surface of the microchip 133. The backside illumination embodiment illustratively shown in FIG. 7 allows for a single microchip 133 to be fabricated that can sense light incident thereon from both front and back directions, and that can emit light signals in both front and back directions.

As described above in relation to FIGS. 4A-4E, 5A-5E, and 6A-6E, nodes 11 can sense signals and harvest energy incident on opposite surfaces thereof by providing the nodes with multiple microchips mounted to each other. Moreover, the use of two microchips permits other arrangements of the energy harvest, analog circuits, digital circuits, sensor components, and power handling circuits. More generally, more than two microchips may be used to form a node without departing from the scope of the present disclosure. In particular, the individual embodiments shown in FIGS. 4A-4E, 5A-5E, and 6A-6E, and the particular combinations of features described in each embodiment, are not meant to limit the possible arrangements of features described herein and useable in combination with each other in various further embodiments.

The foregoing description in relation to FIGS. 2A-2D, 3A-3C, 4A-4E, 5A-5E, 6A-6E, and 7 is focused on hardware aspects of nodes 11 useable in networks such as network 10 described in FIG. 1. In particular, such nodes 11 can be connected into a network 10 of three or more nodes 11 in conjunction with one or more edge nodes 11d serving as base units. The edge nodes 11d serving as base units have a wired or wireless link to a computer, server, or network external to the network 10 and serving as a control system. The control system, which may take the form of a computer external to the network 10 and may be communicatively connected to the network 10 through a base unit and one or more optional networks, reads data to and from the edge nodes 11d serving as base units. The edge nodes 11d may be equivalent to the other nodes in the network, and may further be configured to provide a connection to the control system or to a cluster of inputs and outputs. As an alternative to edge nodes, base units that enable transfer of data into or out of the network 10 may include an array of photodetectors and photosources, as with a camera array of photodetectors. In further descriptions of the network 10 and associated network system, the base unit will be assumed to have the same function as the external control system.

The network 10 and nodes 11 therein communicate with each other across the communication links 13. While various methods and protocols can be used for neighboring node identification and joining, for network formation, and for data and signal propagation through the network, the following describes illustrative methods and protocols used for network formation and network communication.

FIGS. 8A-8H illustrate a method or process for formation of a network of nodes 11 for data readout and write in. In the illustrative embodiment shown in FIG. 8A (and FIGS. 8B-8H), nodes 201-209 are haphazardly disposed in a two-dimensional environment along with a base unit 240 serving as an edge node communicating with a control system (e.g., computer or server reading data from the network, and/or inputting data into the network). As will be evident from the following description, the teachings herein can equally apply to networks having different numbers of nodes, different dispositions of nodes, different environments (including one-dimensional and/or three-dimensional environments), and different numbers of base units or edge nodes.

For ease of description, the nodes presented in the illustrative network of FIGS. 8A-8H are shown as having only two directions of light propagation and detection. However, the methods described herein are in no way limited to nodes having only two direction of communication and, as will be evident from the following description, can more generally apply to all embodiments of nodes including nodes capable of communication in multiple directions (e.g., more than two directions) and multiple dimensions.

The following description steps through a network formation for a cluster of nodes. The nodes each start with a stored data element for transfer out of the formed network. The data element can be auto-generated by the node, or can be a representation of real data captured or measured by the node's sensor. In operation, any node, including the base unit or edge node, without a data element will search for a nearby node with data, connect with the node, and receive the data element. In general, the base unit starts devoid of a data element and, as a result, searches for a nearby node with data to connect to and from which to receive the data element. In turn, the node having transmitted its data element can then search for another nearby node with data, connect to the other nearby node, and receive the nearby node's data element. The process continues until all nodes have transmitted their data and a network is formed.

In detail, the network formation process begins in FIG. 8A with the base unit 240 searching for a nearby node having/storing a data element to transmit. In operation, each node 11 having/storing a data element is configured to transmit a signal for reception by any nearby node(s) during a respective timeslot of a plurality of timeslots that make up a cluster frame. As such, the search by the base unit 240 for the nearby node includes searching for the correct timeslot of any nearby node with a data element to transmit.

In one embodiment, the number of timeslots in a cluster frame is greater than the number of nodes in a node cluster or network, and each node can thus be assigned a different respective timeslot of the cluster frame. In some embodiments, the timeslot has a length of approximately 1 microsecond (μs). FIG. 10A illustrates the timing in greater detail. In the example of FIGS. 8A-8H, node 201 transmits on timeslot 1, nodes 202-209 each transmit on a respective timeslot 2-9. In various embodiments, the timeslot is assigned to each node either at the time of process manufacture or is written to the node microchip prior to network formation. In other embodiments, the timeslot for a chip is randomly generated by the chip processor within a range set at the time of manufacture or prior to network formation.

In FIG. 8A, the digital processor of the base unit 240 functions in receive mode because the node does not have a data element. The receive mode algorithm is detailed in FIG. 9A. In the receive mode, the base unit 240 starts searching for a transmitting partner node by transmitting an optical synchronization signal by flashing its synchronizing light source 253a, or sync-source, at each timeslot until it receives an optical response signal 241 from a neighboring transmitting node 201. After the base unit 240 confirms the response and successfully receives the data from the node 201 which operates in transmit mode, it stores the data element and the timeslot of the transmitting partner node 201. In turn, having successfully connected to the transmitting partner node 201, the base 240 unit repeatedly seeks data at the same timeslot from the transmitting partner node 201 until it collects another data element, or until a timer resets the base unit 240 to cause the base unit 240 to search all timeslots so as to locate any other transmitting nodes within its vicinity.

In response to transmitting the data element to the base unit 240, the processor within the transmitting node 201 changes its mode of operation from the transmit mode to the receive mode and, as shown in FIG. 8A, follows a similar set of steps to those described above to connect with a nearby node 205. The connection of node 201 to node 205 illustrates that there can be more than one node within the field of view of the sync-source 253b of a searching node 201: light flashes from node 203, node 204, or node 205 can all reach the optical interface 253b of node 201. A natural selection is made by node 201 between the timeslots of the confirming nodes 203, 204, and 205 based on a strength of the respective confirming light flashes 213, 219, and 231 of each node. The strength of the confirming flash affects connections in that subthreshold flashes of light (e.g., 219) from a distant or sub-optimally angled node (e.g., 204) will not be detected and weak flashes (e.g., 213) will be detected intermittently (e.g., not reliably) thereby leaving open an opportunity for a closer node 205 with a higher numbered timeslot to connect after a partially made connection. In the embodiments shown in FIGS. 8A-8H, the searching node increases the timeslot number after each failed connection attempt and the node with the lowest timeslot will be selected as the searching node starts searching at timeslot 0. In other embodiments, the searching node processor may start searching at a different timeslot and/or may decrement the timeslot. After connecting with node 205, node 201 will store the timeslot for node 205 as its transmitting partner node, return to transmit mode, reconnect with the base unit 240 and transmit the data element received from node 205 to the base unit 240. Node 205, having transmitted its data element to node 201, will change operating mode from the transmit mode to the receive mode and will search for a transmitting partner node.

FIG. 8B illustratively shows two additional connections being made in the network between nodes 205 and 203 and between nodes 203 and 202. Node 205 may receive confirming flashes from nodes 203, 204, and 207 within its field of view. The connection between node 205 and node 203 is made according to timeslot number as the lower numbered timeslot 3 of node 203 is connected to in lieu of the nodes 204 and 207 having later timeslots 4 and 7 assigned thereto. After node 205 receives the data element from node 203 and transmits the received data element from node 203 to node 201, node 205 returns to the receive mode and searches for additional data from node 203. During the transmission of the data element from node 205 to node 201, node 203 searches for a transmitting partner node.

The central position of node 203 demonstrates the usefulness of the two-sided design of the optical interface detectors and sources. The field of view of node 203 includes confirming pulses from nodes 208, 202 on the "top" side and nodes 206, 201 on the "bottom" side. Topside and bottom side are arbitrary terms in this example referring to two different sides of node 203 on which signals can be detected. All of the nodes listed above are in the field of view of node 203 because the optical interfaces on both sides of node 203 have a sync-source and data detector optical interface. While nodes in this embodiment can recall the timeslot of their transmitting partner, the nodes do not necessarily recall which node receives their data element. Therefore, if node 201 has data from node 205 when node 203 is searching for a transmitting partner, node 203 may attempt to connect to node 201 at the same time that the base unit 240 is trying to connect. Thus, there is a low probability of this given that the node 203 may search during the time of data transfer from node 205 to node 201. However, in one embodiment, a digital processor timer of node 203 waits 5 or more clock cycles before the node 203 searches for a transmitting partner node having data to give time for the data just transmitted by the node 203 to move to a farther node and prevent connections with nodes or base units 205, 201, 240 that have already found transmitting partners. After avoiding node 201 (by waiting 5 or more clock cycles), node 203 will select node 202 based on timeslot number 2 of node 202 being lower than the timeslot number 6 of node 206 and lower than the timeslot number 8 of node 208. Once the connection between node 203 and node 202 has been established, the data from node 202 will be transmitted from node 202 to node 203 and node 202 will enter receive mode and search for a transmitting partner node.

The process continues as shown in FIG. 8C where connections are made between node 202 and node 208 and between node 208 and node 206. The connection 232 is preferred over the connection 217 as the timeslot number 8 of node 208 is lower than the timeslot number 9 of node 209. Additionally, din spite of the lower timeslot number 3 for node 203 versus timeslot number 6 for node 206, the connection 238 is preferred over the connection 215 by node 208 since node 203 has already formed a connection and node 208 uses a timer to wait until the data it sent to node 202 is transmitted away from node 203.

The final data connections are made in FIG. 8D as nodes 206, 207, and 204 form connections with nearby transmitting nodes. It is worth mentioning here that not all nodes form connections in every network. Node 209, for example, may not form a connection 234 with node 204 given the severe angle between the optical interfaces on the two nodes. A four-sided node would have a high probability of forming a connection in this case; however, because node 209 does not include optical interfaces on all four sides, the node may have difficulty forming any connection. With the network complete in FIG. 8D, data from the network can be readout when the base unit 240 requests data from the network and there is data to read out from individual sensor nodes or transmitting nodes. In one example, data can be refreshed from the sensor component every reset frame period. In one embodiment, the nodes in the present invention can also store the receiving partner direction based on which side the synchronizing pulse was detected by the photodetectors of the optical interfaces. Likewise, the nodes can also store the direction of the transmitting partner by virtue of which side the data pulse was detected. Thus the nodes and the base unit have formed a network of connected nodes based on the stored timeslots of each node's transmitting partners and optionally the direction of the same transmitting partner and the receiving partner.

The readout time of a formed network is faster than the network formation time because each receiving node in a formed network already has set the timeslot for receiving data and collisions within a cluster are unlikely since the timeslots are set. For the illustrative network shown in FIGS. 8A-8D, the shortest number of cluster frames to transmit data is 5 when assuming that it takes only one cluster frame to find the correct timeslot for receiving or that timeslot is known and the data element is only 2 bits. Each node has a cluster frame to send data on towards the base unit 240 which acts as a sink for data. The format of the network is essentially a bucket brigade.

For an illustrative case of three nodes and a base unit, the following result is clear: there are two nodes between the third node and the base unit such that the data from that third node is transmitted three separate times giving time of 3*t, where t is the time in cluster frames for 1 data transmission. There is one node between the second node and the base unit so the data from that second node is transmitted two separate times giving time of 2*t. The last node sends data directly to the base unit so the transfer time is 1*t. There is a time reducing effect in that data transmission at the near end of the network can occur while non affected "upstream" units are transferring data. In this example, the data transferred from node two to node one can be transferred from node one to the base unit when nodes two and three are communicating. For the nine nodes in the embodiment shown in FIGS. 8A-8D, the time would be 85*t. Hence, in the case of nine timeslots and 1 microsecond per timeslot, the total time for transmission would be 0.765 milliseconds to read out the simple network.

The foregoing description relating to FIGS. 8A-8D has focused on the transfer of data elements from nodes 11 of the network 10 to the base unit 240. Such communications can be used, for example, to transfer sensing data (e.g., captured by sensor components 112) of the nodes 11 to the base unit 240. In addition, the network 10 can be operative to transfer data between nodes 11 or from the base unit 240 to the nodes 11 of the network 10. For example, the upstream transfer of data to nodes 11 of the network 10 can be used to affect the environment of the nodes 11 by writing values to the nodes 11. As an example, one might want to stimulate a biological tissue or release a chemical from nodes having actuators therein. In other applications, it may be desirable to write firmware data to the nodes in the form of a stream of bits or otherwise reprogram the nodes. Such functionality may be used in biomedical applications where nodes may be implanted in tissue such that physical access to the nodes may be difficult. The functionality can also be used in applications in which input data may be transformed by the network connections as a method of collective processing.

To these ends, FIGS. 8E-8H illustrate an embodiment in which data is written to nodes after a network has been formed (e.g., as described above in relation to FIGS. 8A-8D). The nodes 201-209 and the base unit 240 of FIG. 8E have formed a network of connected nodes based on the stored timeslots of transmitter timeslots and, optionally, the partner node direction. The network can be operated to read data out from the network through operation of the nodes in the receive and transmit modes of operation, as described above, to allow for flow of data in the direction of the arrows 241, 231, 235, 233, 232, 238, 236, 237, and 234 shown in FIG. 8E. In this regard, the flowcharts in FIGS. 9A and 9B detail the data transmit and receive modes of operation of the nodes' processors. Briefly, in the data transmit and receive modes of operation, nodes may transmit a confirmation pulse sequence that is sent first by the receiving node and then by the transmitting node indicating or acknowledging successful transmission of the data element.

In the embodiment of FIG. 8E, the base unit 240 sends a write request pulse 260 to node 201 as part of the confirmation pulse sequence sent after it receives a data element from node 201. In response to receiving the write request pulse 260, node 201 will respond with a ready to receive pulse as part of its confirmation pulse sequence if node 201 is ready to receive. In addition, at the next receive mode, node 201 sends a write request pulse to its transmitting partner node (e.g., node 205) if it has one. A node will send a ready to receive pulse if the node does not have a transmitting partner or the node has received a ready to receive pulse from its transmitting partner. In the network of FIG. 8E, node 201 has a transmitting partner 205 and has not received a ready to receive pulse from node 205, so node 201 only sends a write request pulse 261 to node 205. This process is repeated by all the nodes 205, 203, 202, 208, 206, 207, and 204 in sequence until node 204 as all of those nodes have transmitting partners stored as timeslots and none of the transmitting partners has sent a ready to receive pulse.

Node 209 is the last node in the sequence and it does not have a transmitting partner. Therefore, when it receives a write request pulse 262 from node 204 after transmitting its data element, node 209 immediately sends a ready to receive pulse 263 back to node 204 as part of its confirmation sequence.

In turn, as shown in FIG. 8F, node 209 then reverses the timeslots used in its processors receive mode and transmit modes. Specifically, node 209 will search for data to receive during its previous transmit timeslot, timeslot 9, and node 209 will attempt to transmit data during its previous receive timeslot, which was undefined as it has no transmitting partner. This is represented by the reversal of the direction of the connection 234, as shown in FIG. 8F. Initially, there will not be a node transmitting on timeslot 9 since that was the timeslot for node 209. Moreover, node 209 is devoid of data as it waits for a data transmission from node 204. Node 204, having received the ready to receive pulse 263 from node 209, will send a ready to receive pulse 263 to node 207 at the next data transmission. Node 204 will also reverse its timeslots and direction of connection 237 after sending the ready to receive pulse 263. Node 204 is devoid of data as it waits for a data transmission from node 207.

In FIG. 8G, node 207, having received the ready to receive pulse 263 from node 204, will send a ready to receive pulse 263 to node 206 at the next data transmission. Node 207 will also reverse its timeslots and direction of connection 236 after sending the ready to receive pulse 263. Node 207 is devoid of data as it waits for a data transmission from node 206. The process continues through nodes 206, 208, 202, 203, 205, and 201 with the sequential propagation of a ready to receive pulse 263 through the nodes. In turn, FIG. 8H illustrates the result when the ready to receive pulse 263 has propagated all the way to the base unit 240 and all the connections have been reversed (e.g., temporarily reversed) by switching the transmit timeslots and receive timeslots. In the ready to receive state or mode of operation, the nodes can be set to either generate new data from the sensor or a preset value as with normal readout or to remain devoid of data unless they receive data.

In the embodiment of FIG. 8H, node 201 is illustratively shown as having a data element, such as a data element received from the base unit 240, which will be transmitted to its temporary receiving partner node 205 across link 231. Eventually the data element will be transported through the ordered sequence of nodes to node 209. The base unit 240 can continue to generate data for each node until the base unit 240 is set to not generate data. The base unit 240 can further return nodes to the original state by sending a ready to receive pulse to node 201. The ready to receive pulse will cause nodes to return to normal function even if they did not send a request to write pulse in their confirmation sequence.

In operation, the digital processor 111 of a given node 11 determines when and how to send or receive data. Briefly, the processor 111 has a global master-clock which times progress through a collection of logic and memory unit cells to control the input and outputs of the analog, sensor, and optical interfaces. Several timers and counters function to store incrementing or decrementing variables. The processor 111 can be part of a silicon microchip ASIC, a separate ASIC microchip, an FPGA, or software running microprocessor.

Figure 9A:
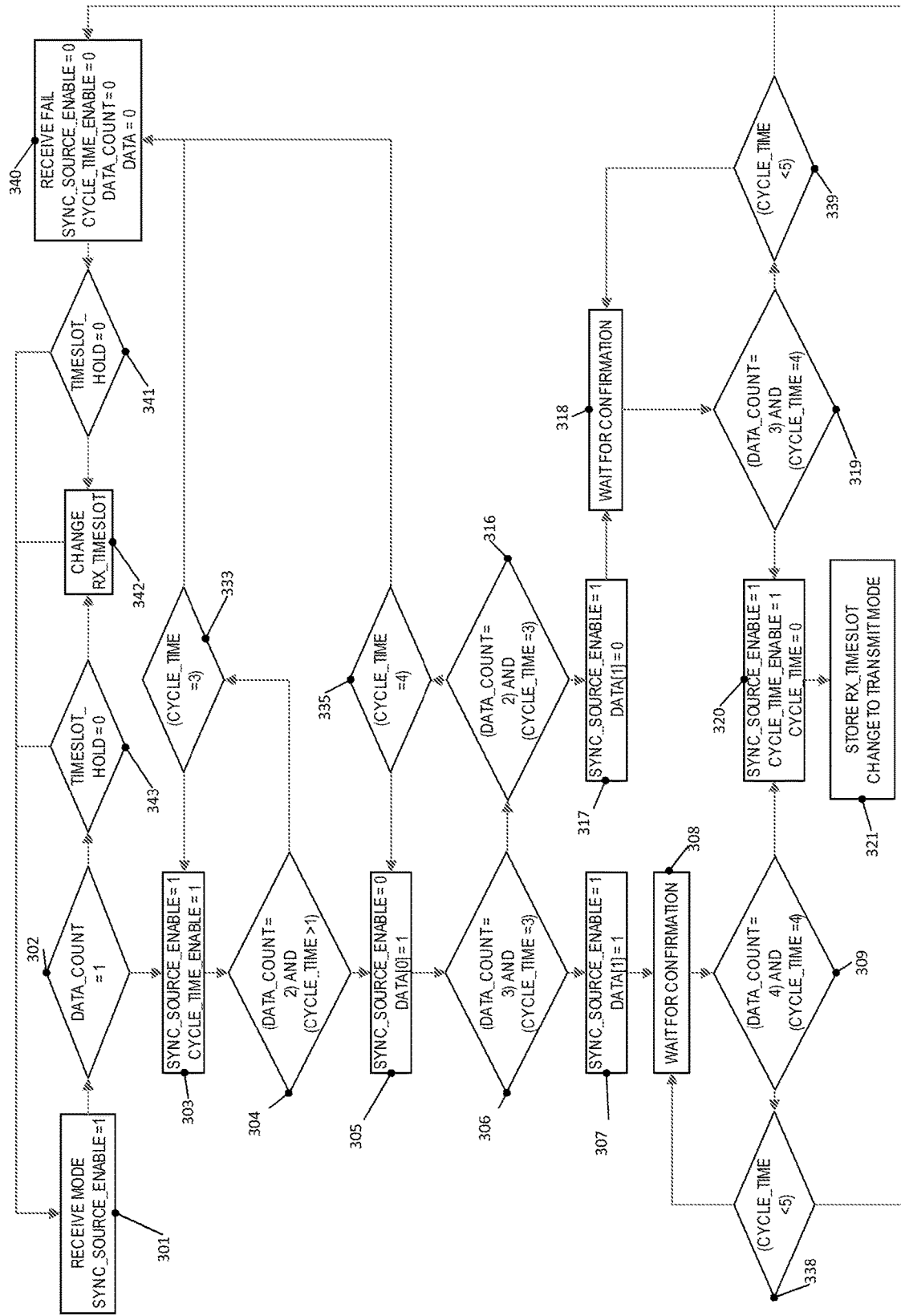
FIGS. 9A-9D are flow charts showing functioning of optical nodes configured for use in self-organized optical networks under various operating modes.
Figure 9B:
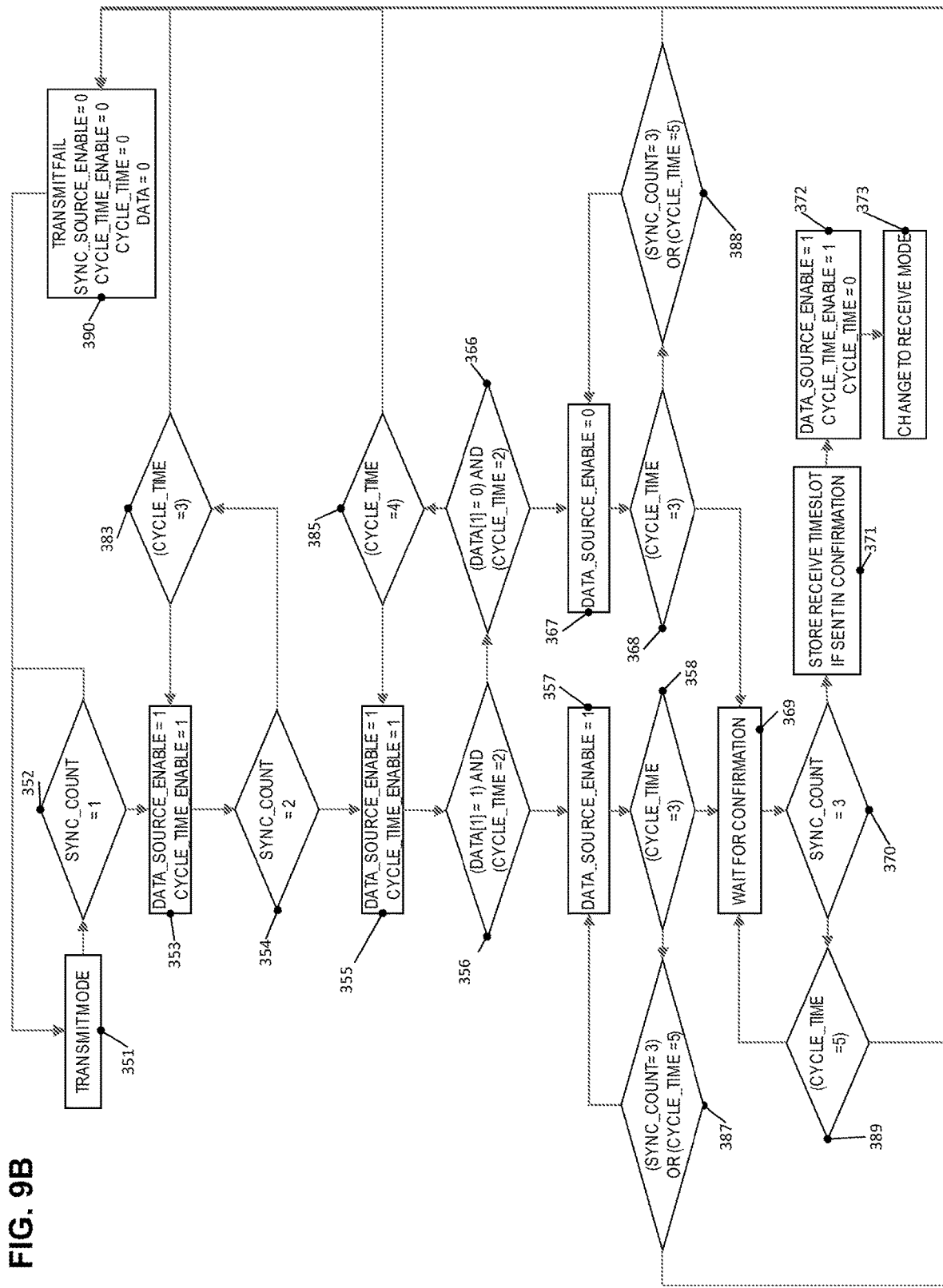

FIGS. 9A and 9B show an illustrative embodiment of operation of the processor 111 of a node 11 in the form of flowcharts for the two primary processes controlling operation of the node 11. In the flowcharts, the rectangular structures represent "activity" blocks and the diamond shaped structures represent "decision blocks". The flowcharts indicate the functional information used to create hardware language code or microprocessor software to form machine code to execute the processors 111. The flowcharts are simplified in order to highlight the functioning of the nodes without necessarily presenting all of the loops, variables, timing controls, or syntax used to implement the processor 111, as the loops, variables, timing controls, and syntax may vary depending on the clock choices and the language selected to encode the flowcharts. The specific numbers used for variables depend on the number of bits used for data transfers and confirming sequences. In addition, the flowcharts are illustrative and can be changed without changing the spirit of the present disclosure. The algorithms disclosed in the flowcharts are intended to operate within a single node or base unit but have expectation of other nodes or base units running similar code for proper function.

The primary modes of operation of nodes 11 are the receive mode, whose operation is detailed in steps shown in FIG. 9A, and the transmit mode, whose operation is detailed in steps shown in FIG. 9B. The operation algorithm of the nodes 11 are described below firstly from the vantage point of a node 11 operating in the receive mode. If a node does not a have a data element, it enters receive mode and searches for an available transmitting partner node. If a node does not have a transmitting partner node pre-determined or pre-stored at the start of operation, the timeslot for that transmitting partner is not fixed and will cycle through all the numbers for the preset timeslots as the receive mode algorithm cycles. The receive mode operating algorithm starts at activity block 301 of FIG. 9A where the variables are initialized for that mode and the node optical interfaces are controlled. A synchronization or sync pulse is sent via the light source of the node's optical interface at a specified timeslot for the duration of a single timeslot. The data photodetector of the node's optical interface is active at one timeslot later than the sync pulse. After a period of time, the decision block 302 checks if the data counter has detected and stored a value of 1 indicating that a response signal has been received from a node transmitting the response signal at that timeslot. If data_count has not reached 1 and if there is not a hold on the time slot value (block 343), the algorithm increments the timeslot (block 342) and returns to block 301 for processing based on the incremented timeslot. If there is a hold on the timeslot (block 343), the algorithm moves back to activity block 301 to try the same timeslot again.

If the data_count has reached one, the algorithm executes activity block 303 which starts the cycle timer and the sync source. The cycle timer counts the number of cluster frames, and is used to ensure the proper timing of node communication. Block 303 persists until the node registers an error when the cycle timer reaches a value of 3 or the data_count is 2 and the algorithm enters activity block 305. A data count of 2 at the correct cycle time sets the first bit of the data element in this 2 bit embodiment. As an extra check on a false positive connection, block 305 turns off the sync source. If the data transmit node detects a sync pulse at this cycle time it will register an error, see FIG. 9B. The algorithm stays in block 305 until the cycle time is 3. At this point the value of data_count is determinant. A value of 3 will lead to block 307 which sets a value of 1 to the second bit of the data element, sends a confirmation sync source pulse sequence to the data transmitting node and moves to block 308 to wait for a confirmation pulse sequence from the transmitting node. A value of 2 will lead to block 317 which sets the second bit of data to 0, sends a confirmation pulse sequence to the data transmitting node and moves to block 318 to wait for a confirmation pulse sequence from the transmitting node. If the cycle time reaches 4 or more while in block 305 an error is registered, and the algorithm moves to block 340. If the algorithm is at block 308 it will stay there until the data_count increases to 4 and block 320 is entered or an error is registered when the cycle time reaches 5 or more. If the algorithm is at block 318 it will stay there until the data_count increases to 3 and block 320 is entered or an error is registered when the cycle time reaches 5 or more. From block 320 the algorithm will store the timeslot if there is not a hold on the timeslot and change to the transmit mode await a receive partner node.

A node with a data element will enter transmit mode and wait for a node in the receiving mode to initiate communication. After a successful transmission of data, the transmit mode node will delete the data element. The details for the algorithm are illustrated in FIG. 9B. The algorithm starts in the activity block 351 where it clears any initialization variables. If a sync flash is detected, the sync count will go to 1 and the algorithm moves to activity block 353 where the data source is turned on to send the first bit of the data element flash and the cycle timer is started. The algorithm stays at block 353 unless an error is registered when the cycle time advances to 3 or the sync_count reaches 2. Transmit mode failure errors will lead to block 390 which clears several variables to reset the transmit mode node in preparation to retry transmission. Typically, the failure is due to not receiving a sync flash within a time limit set by the cycle timer. In the case of decision block 383 the cycle time should not reach 3 before a second sync flash is received. If the sync count reaches 2 within the time limit, the algorithm moves to activity block 355. If the second bit of the data element is a 1, decision block 356 will evoke activity block 357 which sends a data flash for the second bit of the data element in this embodiment of 2 data bits. If the second bit of the data element is a 0, decision block 366 will evoke activity block 367 which does not send a data flash for the second bit of the data element in this embodiment of 2 data bits. From activity block 357, the algorithm moves to block 369 after the cycle time reaches 3 unless a sync pulse is detected, and the sync count is 3. The receiving node should turn off its sync source after the second data pulse is detected, see block 305, FIG. 9A. A third sync pulse at block 387 would indicate the receiving node has not received the second data pulse. From activity block 367, the algorithm moves to block 369 after the cycle time reaches 3 unless a sync pulse is detected, and the sync count is 3. Activity block 369 is where the algorithm waits until the confirmation sync pulse is counted and results in a sync_count of 3. The confirming sync pulse can be sent on the transmit timeslot as is the data or can be sent on the timeslots of both the transmitting and receiving nodes. Sending a confirmation on the receiving node timeslot will inform the transmitting node of which node received the data. The sending of the confirmation uses extra energy and may be done only when that information is useful. If the cycle time reaches 5 without a confirmation at block 389 an error is registered. With sync_count at 3, block 370 selects block 371 which stores the receive node timeslot if it was sent as detailed above. Block 372 activates the data source sending the confirming sequence. In block 373 the algorithm sets variables and clears the data to change to receive mode.

Figure 9C:
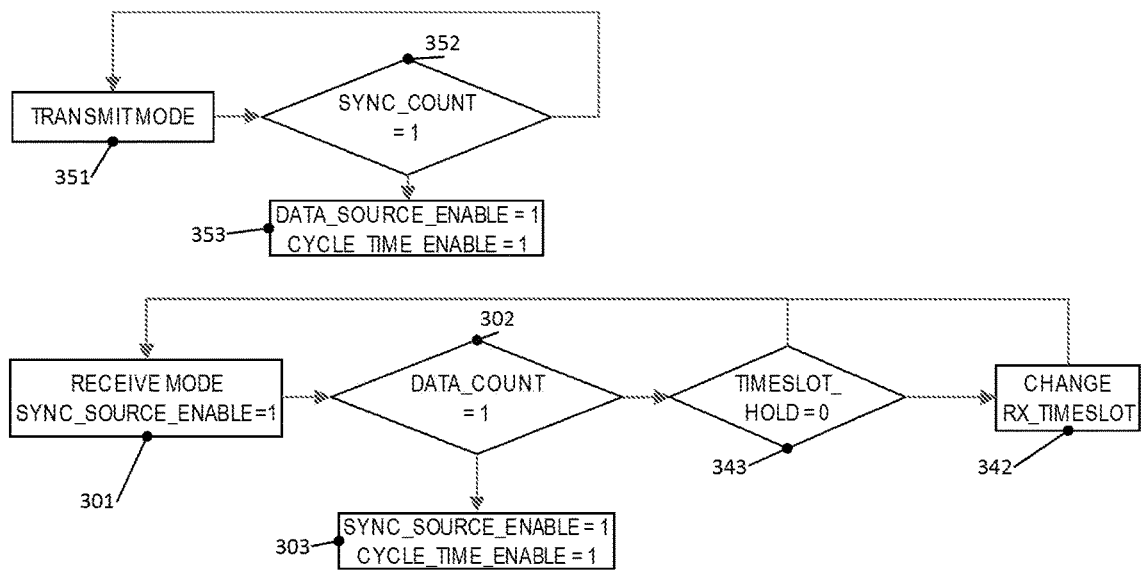
Figure 9D:
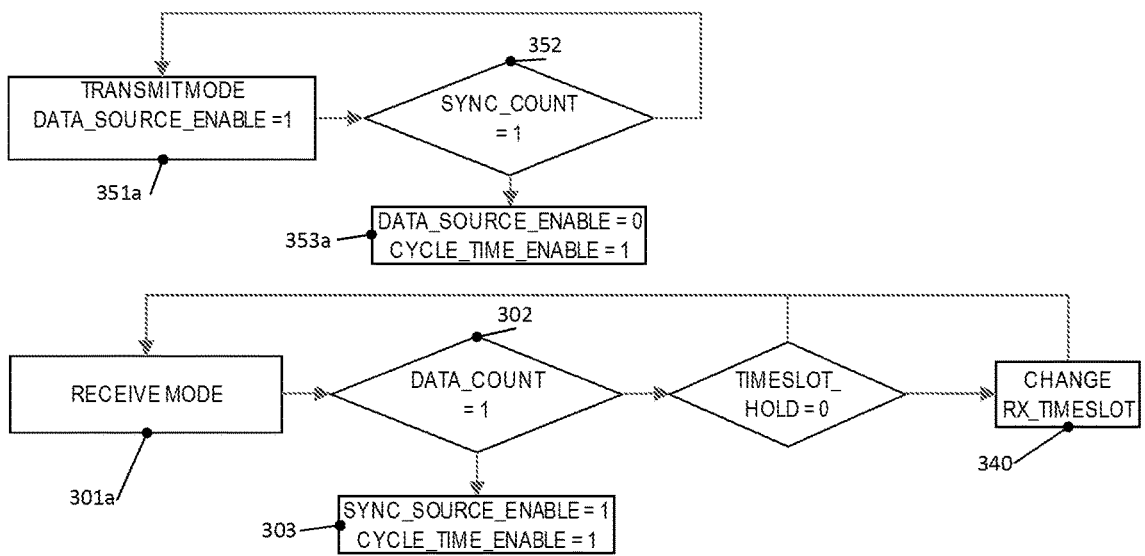

In the embodiments disclosed in FIGS. 9A-9B, the receive mode node initiates the communication and then changes the timeslot it searches on if enough time elapses and the timeslot has not been fixed. The transmit node waits for a flash on its timeslot to change sync_count to 1 and proceed. This method is receive node initiated communication. Receive node initiated communication may make forming a network simpler as the initial network connections are made with most devices not flashing since they are likely in transmit mode until a base unit or empty node initiates communication. However, communication can alternatively be transmit node initiated, which can be useful when a node with a data element communicates with several receiving nodes at one time. In FIG. 9C the activity blocks for the receive node initiated communications from FIGS. 9A and 9B is extracted for convenience. In activity block 301 the receive mode sync source is enabled inducing light flashes at a selected timeslot until the receive mode algorithm increments its receive timeslot at block 343. The transmit mode does not increment its transmission timeslot in blocks 351 and 352. FIG. 9D illustrates an embodiment of transmit node initiated communication. The primary algorithm change is that the transmit mode activity block 351a in FIG. 9D turns on the data source to flash and the receive mode block 301a disables the sync source flash. The result is that the transmit node flashes its light to initiate communication. The timeslot of the receive node is used for both the sync source and the data detector. After the transmit node data flash is detected by the receive node data detector and counted by the receive mode node, the algorithm is largely the same. However, the transmit mode has another significant change in that in block 353a the data source is turned off, unlike block 353, FIG. 9C. Switching off the data source will result in the proper pattern of data flashes. While the transmit node initiates the communication, it is still the receive node which searches for the proper timeslot by incrementing the data detector time slot.

The flowcharts shown in FIGS. 9A-9D illustrate the activities and decision criteria of the processor 111 implemented as a finite state machine. For embodiments running synchronously, the timing of the activities will affect the decisions of the algorithm. FIGS. 10A-10E illustrate several time signals for processor input and output switches as the result of communication between nodes for different embodiments. The time signals presented are not exhaustive of all the internal signals of the processor disclosed in the present invention. Rather, shown are only a selection of signals useful to inform one trained in the art on the timing useful to implement the present invention.

The time signals for the receive node initiated communications embodiment of the present invention detailed in the flowcharts of FIGS. 9A-9B are illustrated in FIG. 10A. Four switches are shown, Node 1 sync source switch 410, node 1 sync detector switch 420, node 5 sync source switch 430 and node 1 data source switch 440. The sync source switch enables or disables the synchronization light source, typically an LED, for communication from a node in receive mode. The data source switch enables or disables the data light source, typically an LED, for communication from a node in transmit mode. The sync detector switch activates the reading of the sync detector circuitry into the digital processor. By turning on or off the sources and detectors based on timeslots, a specific node can be communicated with excluding other nodes within the wide beam optical sources and detectors. When a node has data, it enters the transmit mode as detailed in FIG. 9B. Node 1 is in transmit mode and the sync detector 420 is repeatedly turned on at timeslot value 1 within a cluster frame of 16 timeslots, 421-428. Node 1 is waiting in a loop for a sync source signal delivered at its timeslot value of 1. Node 5 enters receive mode and periodically activates its sync source switch 430 at incrementing timeslots, 431, 432 and 433. Initially the sync source 431 and sync detector 422 switches are not aligned. When the timeslot of the sync detector switch 424 matches that of the sync source switch 433, node 1 toggles its data source switch 440 to send a pulse 441 in response to node 5. Node 5 data detector detects the pulse 441 and sends a confirming pulse 434 with its sync source switch. The pulse 441 causes node 5 to fix the timeslot of the sync source pulse 434 for further communication at the next cluster frame. The second detected sync source 434 is aligned. Node 1 sends a predetermined amount of data based on the design of the nodes after receiving pulse 434. In the embodiment shown in FIG. 10A there are two bits of data sent. The first bit 443 value is 1 and the second bit 444 value is 0. After successful receipt of the data, node 5 sends a confirming sync source pulse 438 and node 1 responds with a confirming data source pulse 445. Node 1 changes to receive mode and activates its own sync source switch pulse 411. Since pulses from nodes not in communication with node 5 or node 1 can send broad beam light flashes at the transmit node timeslot, the absence of pulses at the correct moment is informative of a proper connection. An example is the third sync source switch pulse 438. If the pulse coincides with the sync detector switch pulse 428 it is a successful confirmation. If a third pulse is detected in alignment with the sync detector switch pulse 426, it will result in an error, as detailed in FIG. 9B at decision block 387.

After the network connections are formed as stored receive mode timeslots and transmit mode send direction, the speed of transmission of data through the network increases. The primary change post network formation is the time savings from not searching for the timeslot. FIG. 10B illustrates the same embodiment illustrated in FIG. 10A after a connection has been made between node 5 and node 1. After a successful receipt of a data element from a third node, node 1 stops activating its sync source switch 412 and readies to receive a sync pulse via its sync detector switch. The first sync detector switch pulse 425 detects a sync source pulse 438 from node 5. Within 5 cluster frames node 1 is back in receive mode and sending a sync source switch pulse 411. In FIG. 10A, node 1 used 7 cluster frames to connect and transmit data, 422 to 428. An additional scenario is shown in FIG. 10B. The value of the second bit 444 of the data element has a value of 1 rather than a value of 0 in FIG. 10A, at 444.

Other embodiments of the present invention do not change the general concept of the initiation, confirming signal, data and confirmation signals. Three additional embodiments' time signals are shown in FIGS. 10C-10E, and combinations of these timing signal diagrams can be used to generate bidirectional complex networks. The transmit node initiated communication method is illustrated in the flowchart in FIG. 9D. The corresponding switch time signals are shown in FIG. 10C. Unlike the embodiment shown in FIGS. 10A and 10B, the node 1 data source switch 440 repeatedly pulses while the node 5 data detector switch increments its timeslot until there is a match between the data source switch 441 timeslot and the data detector switch 452 timeslot. At this point the node 5 sync source switch is active for the first time. The remaining communication signals are as shown in FIG. 10A. In some cases, it would be useful for the transmitting node to store the identity of the node it transmits the data to. The receive node identity detection embodiment illustrated in FIG. 10D has a feature that allows the receiving node 5 to send the value of its timeslot and/or id to the transmitting node 1. The transmitting node, 1, has a sync detector switch duration to cover the entire cluster frame. This allows it to detect the normal confirming sync source pulse 434 and an additional sync pulse 435 sent via node 5 sync source switch. Sync pulse 435 occurs at the timeslot corresponding to the identity value of the receiving node, 5. Node 1 detects the timeslot of the additional sync pulse 435 and stores it as the identity of is receiving partner. It is worth noting that no other node in the local cluster will have the same identity and thus it is unlikely that a false identity will be recorded. If a false identity is recorded, future transmissions that make use of this data will fail and after a timeout the connection between the two units will be cleared from each node's memory and reattempted.

The last embodiment shown in FIG. 10E has both transmit initiated connections 441 and receive identity detection 435 as well as three other features. The first feature is a data element of more than two bits. In FIG. 10E, there are 5 data bits 443-447 sent via the data source switch signal 440. These data bit can encode a variety of information beyond a sensor value. For example, they can encode the identity of the original source of a sensor value as well as the sensor value. In another embodiment, one bit could be reserved as the ready to receive signal sent from a transmit node that is ready to change the data flow direction. The second feature shown in FIG. 10E is an additional sync pulse 436 which can indicate a request to write message from the receiving node such as that illustratively described in FIGS. 8E-8H. The transmitting node is expecting the extra sync pulse 436 with an additional sync detector pulse 427. The third feature added is the extension of the sync detector pulse 427 to cover the entire cluster frame. This adds a second receive mode identity detection to occur. This double identity detection is useful in many cases including that of a transmit node communicating with two nodes simultaneously. In this case, the transmit node can compare the initial receive node identities with the second list of identities to determine if any node had a failed communication. The identity confirming pulse 437 frees pulse 438b for use as an extra confirmation since pulse 437 confirms the receipt of data. In addition, the presence or lack of a data pulse at 448 could be used to convey an extra data bit. All the presented time signals in FIGS. 10A-10E provide information to design the timers, counters, edge detectors and clocks to add timing to the processor algorithm.

The network nodes can operate with an internal clock or from a clock signal detected from the energy harvested source. For the embodiments with an internal clock, there can be a synchronization of the clocked timeslots to achieve the fastest write in or readout data rates. While embodiments without a synchronization of the node master clocks will function, the networks run significantly slower due to an increase in errors as the node clocks drift apart. Similarly, each node within a cluster can have a different internal value for the same timeslot. However, the network operation will have an increase in failures. For example, for a 16-timeslot cluster frame, a node 7 in transmitting mode may have an internal value of 7 of 16 for the timeslot that it connects with receiving node. Due to an offset between the two nodes start up times, the receiving node may have an internal value of 3. The receiving node can seek the transmitting node at timeslot 3 and if it stores the identity of the transmitting node it will store it as 3 which would not be correct with reference to the actual identity of the transmitting node. This will not have a significant effect on the readout of data. For more complex bidirectional networks, the real node identity may be critical to partnering with multiple nodes for read and write. When needed, the master clock and cluster frame timeslot numbers can be synchronized with a global signal.

In one embodiment, the global signal is sent as a pulse detectable by all the nodes in a cluster. This can be a source external to the network or one of the nodes selected at the time of network placement. The global signal synchronizes both the master clock and resets the cluster frame counters to 0 in all the nodes. Alternatively, one of pairwise methods of synchronization could be used to pass a synchronization signal or message between nodes when a global signal is undesirable.

Figure 11A:
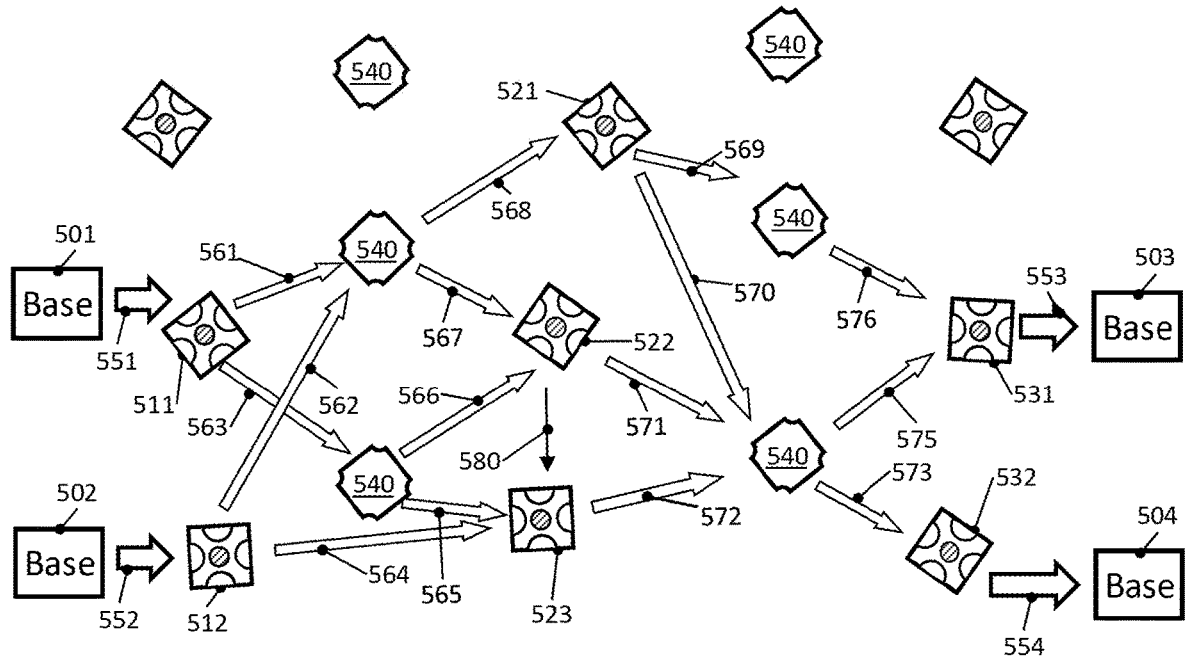
FIGS. 11A-11P are network diagrams showing an illustrative computational/neural network and communication functions thereof.

The embodiment illustrated in FIGS. 8A-8D presents a unidirectional readout network useful for sensor readout networks. The embodiment illustrated in FIGS. 8A-8H presents a bidirectional readout and write in network useful for sensing and stimulating the network environment. The simple networks shown in FIG. 8 should not limit the present invention to simple networks. As an example of a more complex network that can be created with the present invention, FIGS. 11A-11P illustrate how a bidirectional multimode connectivity network can be formed using the nodes described above and node processing disclosed in FIGS. 9A-9D and 10A-10E. Such a complex network can be used to process data input to the network by base units (e.g., 240, 501, 503) or the individual nodes 11 in the manner of a computation or neural network. FIG. 11A presents a network diagram with nodes and links/connections presented as those contained in FIG. 8A-8H. Nodes 511, 512, 521, 522, 523, 531, and 532 form links/connections identified by arrows 561-573. The nodes can send data to and receive data from base units 501-504. In addition, special nodes 540 function as optional repeater nodes. The repeater nodes 540 are physically the same as the other nodes in the network except that they pass data and sync pulses detected at one set of optical interfaces out all the other sets of components with a small latency. The latency or time between receipt of the pulse and output of the flash generally is a quarter of a master clock pulse or less. These nodes 540 increase connectivity between standard nodes, such as 511 and 522, to function even when far apart for low noise light detection. The repeater nodes are shown in FIG. 11A as being 4 sided but the various embodiments of the nodes illustrated in FIGS. 2A-2D, 3A-3C, 4A-4E, 5A-5E, 6A-6E, and 7 can be used to form 2 and/or 3 dimensional networks. The function of individual nodes such as 511 and 512 do not limit the number of base units connected to the network for simple or complex networks nor the direction of communication between the bases and the nodes. In FIG. 11A, the base units 501 and 502 are shown sending data into the network and the base units 503 and 504 are shown receiving data from the network.

With the general composition of the network of FIG. 11A presented, the functioning of the processors of the nodes in the network may include the ability to change from readout mode (e.g., as described above in relation to FIGS. 8A-8D) to write mode (e.g., as described in relation to FIGS. 8E-8H). The ability to change between the readout and write modes may be used for reading out the data from the computational/neural network, and for writing in the weights of nodes or links used to transform data propagating through the network at each node in order to effect network-level computation. Moreover, each node's processor in the embodiment of FIG. 11A allows for multiple links/connections between the nodes to enable computational/neural network processing. This is achieved with an adjustment to the part of the processor algorithm which deletes the data from a transmitting node after a single successful transmission and a change to the algorithm that causes a receiving node to stop searching for transmitting partners after a single successful receipt of data. Instead, in the embodiment of FIG. 11A, a receiving node will stop searching for transmitting units only when it has received from all nodes on its internal list of transmitting partners, and the node may thus store more than one receive timeslot. Similarly, a transmitting node will keep sending its data element until its internal list of receiving units has been exhausted. As such, the transmitting nodes will track multiple partners and the processor may include the feature for receive node identity detection detailed in FIG. 10D. In a neural network, it may be time and energy saving for a transmitting node or unit to send its data to all of its receiving partners at once. For this purpose, the transmitting node may initiate the communication as in FIG. 10C.

Typically, nodes or "neurons" in a given layer of the neural network (e.g., FIG. 11A) are not connected to each other. If this limitation is desired for a given network, nodes of the network are provided with the ability to reject such connections between nodes of a same layer. For example, a processor feature can enable nodes 522, 523 to compare the identities of their transmitting partners 511, 512 with that of an identity embedded in the data element, wherein the embedded identity is the identity of the node 511 which transmitted the data. If the embedded identity equals one of the transmitting partners, the connection 580 is blocked as the communicating nodes 523, 522 would be in the same layer. Unlike networks of nodes which store a single receive node or transmit node, the network of FIG. 11A can send data in a loop. Such a loop, such as a loop between nodes 522, 523 and 511, can be prevented by using the same embedded identity. A node such as 511 will reject any transmission connection from a node 523 if that node transmitted an embedded identity such as 22, that matches one of its stored receive partner identities such as the identity of node 522. These restrictions may be removed after a network is formed or the size of the data portion of the data element will be limited by embedding the last transmitter identity.

Figure 11B:
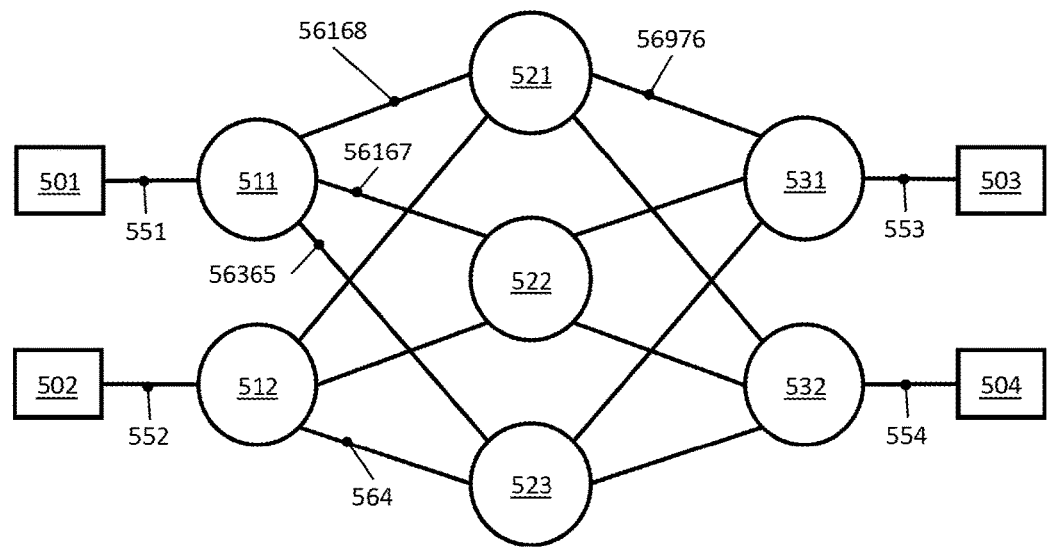
Figure 11I:
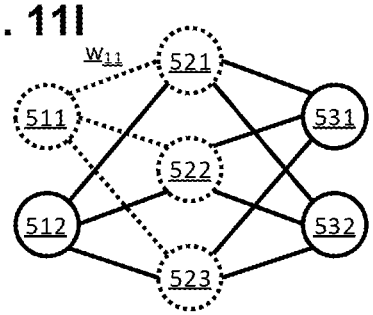

The network formed in FIG. 11A can be redrawn in simplified form as that of FIG. 11B to present the device network as a neural network diagram. The nodes 511, 512, 521, 522, 523, 531, 532 and base units 501-504 retain the same reference numbers in FIGS. 11A and 11B. The connections from and to a given node or base unit are indicated with a line such as 551. In the figure, the connections that do not use a repeater node are identified using 3-digit numbers, such as 564. In contrast, the connections 561, 567 of FIG. 11A that use a repeater are renamed in FIG. 11B as the combined numbers 56167 of the two connections.

As shown in FIGS. 11A and 11B, the device network can have the network topology of a fully connected neural network. Each node represents a computational neuron. In the illustrative example discussed here, there are three layers of nodes as neurons: nodes 511 and 512 are in the input layer, nodes 521, 522, and 523 are in the hidden/middle layer, and nodes 531 and 532 are in the output layer. The network is termed fully connected as each node of a layer is connected to all the nodes in an adjacent layer. Each link/connection, such as 56976, in a neural network has a weight or scale factor and a bias, or added value, that modifies the data passing through the connection and integrated within the receiving neuron or node. While the weight of a link/connection is traditionally shown above a connection, the references to the connections in FIG. 11B do not refer to the weights. In FIG. 11B, the weights are not shown explicitly outside of FIGS. 11I-11O for clarity, and the neurons of the computational/neural network will be referred to as nodes herein. For simplicity in the description, the transmit timeslot of a given node is the last two digits of its node reference number.

As with networks disclosed in FIGS. 8A-8H, the neural network is first formed by the nodes and base units through a self-organized discovery process before the network can be used. As the network of FIG. 11A uses transmit initiated connections, the nodes start without data rather than having data therein as the networks of FIG. 8A. A possible network formation based on the above mentioned processor features will be disclosed. There are numerous permutations in network formation depending on chance and physical layout of the nodes. The connection scheme presented below is only one possibility to indicate the function of the network formation process. In FIG. 11C, node 511 has data from a base unit (e.g., 501) so it flashes its data source light/LED until node 521, having incremented through timeslots, matches its data detector to the proper timeslot for node 511, which is timeslot 11. Node 511 passes the data element to node 521 and stores the receive node identity of 21 to its receive partner memory. The identity was obtained via the receive node identity detection feature. Node 521 saves the data element and stores the transmit node identity of 11 to its transmit partner memory. The identity is simply the successful receive timeslot, timeslot 11. Thus, connection 56168 has been made and stored as the transmit partner and receive partner identities in nodes 511 and 521.

In FIG. 11D, the process continues and node 511 obtains another base data element and searches for a receive partner. Node 521 is in transmit mode looking for its own receive partners at this point so node 511 will connect with 522 which is in receive mode. The connection will be stored as a new receive partner for node 511 and a first transmit partner for node 522. At the start of the process of FIG. 11D, node 511 had one known receive partner so it will hold its data element until it reconnects with node 521. At the start of the process in FIG. 11D, node 521 had no previous transmit partners so it will not search for additional data elements. Instead, node 521 will enter transmit mode and send data source flashes until it finds a receive partner. First, node 521 will connect with a node, possibly node 531, and store the connection 56976 as detailed above. After re-entering receive mode, node 521 will collect the second data element from node 511, releasing node 511 from its transmit mode as node 511 will have transmitted to its known receive partner. Node 521 will then flash its data source until it finds a new receive partner 532 and makes a connection 57073, stores the receive partner's identity and reconnects with its original receive partner 531. Node 521 may connect with 531 first and then 532, or it may connect with 532 first then 531, or, if both flash their sync sources at the same time, it will connect to both simultaneously. Simultaneous connection formation is possible because the double receive node identity detection feature, illustrated in FIG. 10E, allows the identity of more than one receive partner to be collected in a single cluster frame. Eventually, if node 531 finds no additional partners, a timeout will clear the data from the memory of node 521 and it will re-enter receive mode.

Further connections are formed in FIG. 11E. Connection 56365 is formed when node 511 receives a data element from a base unit and flashes its data source. As with connection 57073, connection 56365 can occur simultaneous with re-connections of 56168 and 56167, or connection 57073 can occur separately. In either case, the identity of node 523 will be added to the list of receive nodes for node 511. While connection 56365 is being made, node 522 will enter transmit node since it has no list of additional transmit partners. In transmit mode, node 522 will send a data flash until connections are made with nodes 531 and 532 separately or together. If separately, node 522 will not pair with the remaining unpaired node until it receives a new data element from node 511. If paired together, node 522 will re-connect with both nodes at the next receipt of a data element from 522. Note that node 521 will be attempting connections with nodes 531 and 532 as well. Transmitting nodes can connect with one or more receiving nodes, however in the embodiment illustrated in FIGS. 11A-11E, receiving nodes can only communicate with one transmitting node at a time. The network connections 57275 and 57273 are made in FIG. 11F in a manner like 57175 and 57173.

The network has been formed with only the input base unit 501 connected to node 511 being active. The output base units 503 and 504 connected to nodes 531 and 532 have been actively reading data. At this point the next input base can be activated to form the final connections for node 512. While all input bases could be connected at once, data collisions are more likely and a sequential connection is thus described herein for clarity. In FIG. 11G, the final connections are made when data is transmitted to node 512 until all the connections are made.

A method or approach for determining that the network is completely formed can be used because, absent a criteria to stop network search and formation in the nodes, a network that allows multiple receive and transmit partners for each node will search for partnerships with every node in the cluster. Unlike a single partner networks, as in FIG. 8A-8H, allowing multiple partner networks to continually repair would prevent timely data transmission. In one embodiment, a criteria used to stop network search and formation is to have a time out after which the network is considered fixed. In another embodiment, the criteria is to vary the input data in a sufficiently complex pattern such that the output data pattern varies in a correspondingly complex pattern. Any changes in the output data as new network connections are made will be observable. Once the pattern consistently repeats, the network can be said to be fixed, such as with the connections shown in FIG. 11H. The stop network formation signal could utilize the extra sync pulse 438*b* in FIG. 10E. The pulse 438*b* would be send by the output base units to the nodes 531 and 532 based on a user decision. The node processors would propagate the signal backwards through the network until each node is in fixed network mode. If the output base units stop sending the pulse 438*b* then the network could change connections.

Figure 11J:
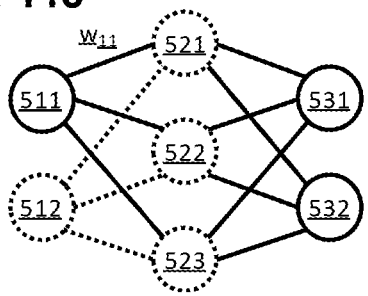

FIGS. 11I-11M show the forward transmission and processing of data through the previously formed computational/neural network of FIG. 11H. Base units 501 and 502, not shown, connected to nodes 511 and 512 transmit data causing nodes 511 and 512 to enter transmit mode. The node with a lower transmit timeslot will flash its data source first connecting with the three receive mode nodes with node 511 as a stored transmit partner. If any of node 511's receive partners do not send an expected early identity confirming sync source, pulse node 511 will wait a set number of cluster frames before transmitting the data. If node 511 fails to receive a second identity confirming sync source pulse, it will resend its data until all expected nodes have confirmed or a timeout occurs. Unlike the networks of FIGS. 9A-9B, nodes 521, 522 and 523 will not immediately enter transmit mode upon receipt of data. In the computational/neural network embodiment, the node processor will wait until it receives all expected transmit partner data. In FIG. 11J the second layer of nodes wait for node 512 to transmit its data.

When the second layer of nodes 521, 522, 523 have received all their expected data transmission, or timed out while waiting, they will transform the data. The transformation can be any functional transformation desired and implemented in the processor.

Figure 11K:
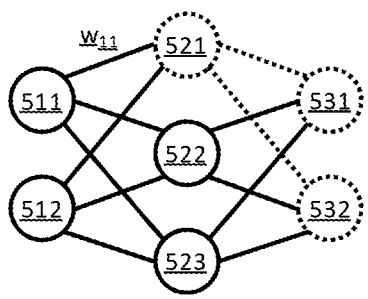
Figure 11L:
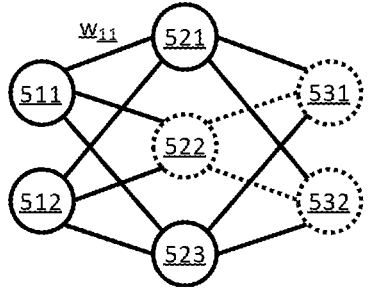
Figure 11M:
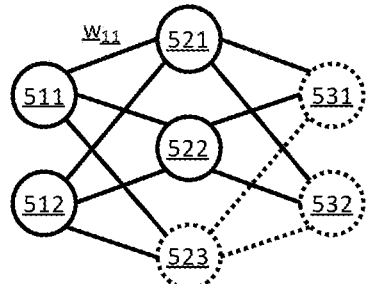

To change the effect of the transformation so as to improve the network computational/processed result, a variable weight and optional bias is applied to the stored data in nodes 521, 522 and 523. The nodes in layer 2 then enter transmit mode and flash their respective data pulses in order of node identity as was the case for nodes 511 and 512. FIG. 11K shows the layer 2 node 521 with the lowest timeslot value, 21, that will likely be the first to connect to its known receiving partners 531 and 532 and transmit the transformed data. The nodes 531 and 532 will hold the data value until they receive data from their other transmit partners 522 and 523. In FIG. 11L, node 522 transmits to its receiving partners 531 and 532. Finally, in FIG. 11M, node 523 transmits its data to nodes 531 and 532. In each case, a given transmitting node will not stop sending its data until all its stored receive partners have sent their second confirming pulse or a timeout occurs.

At this point, having received all their expected data, nodes 531 and 532 will transform the stored data using their weights, biases, and coded transform functions. The output base units will read out the data and the user will have access to the processed input data through base units 503 and 504.

Figure 11N:
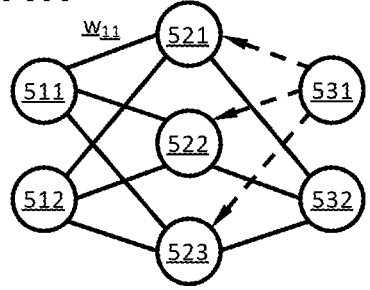
Figure 11O:
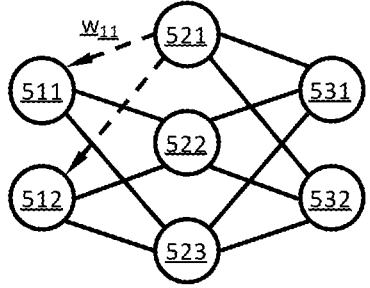
Figure 11P:
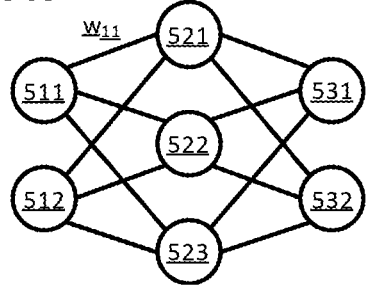

An important part of processing performed in a computation/neural network of nodes is the ability to change the weights and optionally the biases to improve the output processed data. For this purpose, the network may invert the direction of the dataflow to send back appropriate weight changes. In FIG. 11N, the user has assigned a weight adjustment value to be propagated backwards through the network. The base unit sends a request to write signal to node 531 which propagates back through the network as disclosed in FIGS. 8E-8H and 10E. When node 531 has received its weight adjustment value from the connected output base, it will adjust the weights it uses to transform its stored data from nodes 521, 522 and 523. When nodes 521, 522 and 523 have sent their ready to receive signals, node 531 transmits a data element which contains an adjustment value which can be interpreted by the nodes 521, 522, or 523 to adjust their weights based on a desired weight adjustment function. The adjustment value may be a function of the stored values last received from each of the transmitting partners of node 531. After nodes 521, 522, and 523 have received similar adjustments from all their respective original receiving partners, they will calculate an adjustment value to transmit to their original transmitting partners. FIG. 11O illustrates the transmission of the weight adjustment values by node 521 to its original transmitting partners 511 and 512. Nodes 511 and 512 will use the weight adjustment values to modify the weights applied to the input data from their respective input base units. They will then attempt to transmit adjustment values to their respective input base units. When the input base units, which do not use weights, register receipt of adjustment values they will make the values accessible to the user and delete the values. The user then sends a ready to receive from the output base units 503, 504 to nodes 531 and 532. This will cause the network to change the direction of the data flow back to the original orientation and the network is ready for the next series of input values. When the user wants to keep the weights and biases fixed, the output bases would simply not send a request to write signal after reading the network output of the processed input data.

In accordance with the foregoing disclosure, an optical networking system connects more than two small nodes into a self-organized network. After network formation the interface unit or units can induce the networked nodes to readout data, write data to the network, or affect network topology to process data. Additionally, the network nodes are capable of functioning with incoherent, wide beam light, and are tolerant of node densities such that multiple nodes may detect the transmitted beam of a given node. Each node includes a control processor, analog circuitry, and optoelectronics simple enough to be powered by energy harvesting components.

Furthermore, the foregoing disclosure provides methods for forming a network between a collection of nodes. The nodes self-organize into a network and, in turn, interface units request to transfer data to and from memory integral to each node. The nodes form the network based on a pairing scheme that uses some combination of node assigned timeslots, ordered pairing priority, node orientation, and node-to-node distance. Individual nodes disrupt a poorly formed system independent of external user or system assessments.

In these regards, the nodes can form simple unidirectional networks, bidirectional networks, or complex bidirectional networks with adjustable link weights capable of computation.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A self-organized optical network, comprising:
  a plurality of optical nodes each configured for optical communication with other optical nodes of the self-organized optical network; and
  a base unit configured for optical communication with optical nodes of the self-organized optical network, and for communication with a computer external to the network,
  wherein each optical node of the plurality of nodes is assigned a different respective timeslot, of a plurality of timeslots of a cluster frame of the optical network, for communication with the other optical nodes of the self-organized optical network, and each optical node transmits data, during the assigned respective timeslot of the optical node, to one or more transmitting partner nodes of the plurality of optical nodes, and
  each optical node is configured to select the one or more transmitting partner nodes by performing steps of transmitting an optical synchronization signal during each timeslot of the plurality of timeslots of the cluster frame of the optical network, monitoring for an optical response signal to each transmitted optical synchronization signal, and selecting as the transmitting partner node another optical node from which the optical response signal is received.

2. The self-organized optical network of claim 1, wherein the timeslots are ordered, and
  each optical node is configured to select as the transmitting partner node an optical node having the lowest timeslot from among other optical nodes from which the optical response signal is received.

3. The self-organized optical network of claim 1, wherein the timeslots are ordered within a repeating cluster frame of the optical network, and
  each optical node is configured to transmit the optical synchronization signal during each timeslot of a plurality of cluster frames, monitor for the optical response signal to each transmitted optical synchronization signal over the plurality of cluster frames, and select as the transmitting partner node another optical node from which the optical response signal is reliably received over the plurality of cluster frames.

4. The self-organized optical network of claim 1, wherein each optical node is operative to store a data element, and
  each optical node is configured to operate in a transmit mode of operation when the optical node stores the data element, and to transmit the data element during the optical node's assigned respective timeslot when operating in the transmit mode.

5. The self-organized optical network of claim 4, wherein each optical node is configured to operate in a receive mode of operation when the optical node does not store the data element, and to monitor for transmission of a data element from the selected transmitting partner node during the selected transmitting partner node's assigned respective timeslot when operating in the receive mode.

6. The self-organized optical network of claim 1, wherein the base unit is configured to trigger the plurality of optical nodes of the optical network to operate in a write mode of operation in which data received from the base unit is propagated through the plurality of optical nodes, and
  each node is configured to operate in the write mode of operation and to transmit a data element during the selected transmitting partner node's assigned respective timeslot when operating in the write mode.

7. The self-organized optical network of claim 1, wherein each optical node of the plurality of optical nodes is configured to select a single transmitting partner node as part of forming the self-organized optical network.

8. The self-organized optical network of claim 1, wherein the plurality of optical nodes are each configured to transmit broad-beam uncollimated light for optical communication with the other optical nodes of the self-organized optical network.

9. The self-organized optical network of claim 1, wherein each optical node of the plurality of optical nodes is configured for optical communication with other optical nodes disposed in three different orthogonal directions from the optical node.

10. The self-organized optical network of claim 1, wherein each optical node is configured to receive, from one or more other optical nodes of the self-organized optical network, a data element, to transform the received data element according to a weight or bias, and to transmit the transformed data element to one or more other optical nodes of the computational network or to the base unit.

11. The self-organized optical network of claim 10, wherein the base unit is further configured to trigger the plurality of optical nodes to operate in a write mode of operation in which data received from the base unit is propagated through the plurality of optical nodes and used to change the weight or bias applied by the optical nodes to received data elements.

12. The self-organized optical network of claim 10, wherein at least one optical node of the plurality of optical nodes is configured to receive optical communications including data elements from a first plurality of the optical nodes, and to transmit optical communications including the transformed data elements to a second plurality of the optical nodes different from the first plurality.

13. The self-organized optical network of claim 1, wherein at least one optical node of the plurality of optical nodes includes a sensor component, and the at least one optical node is configured to transmit a data element including data received from the sensor component to other optical nodes of the plurality of optical nodes.

14. A method of operating a node configured for optical communication with other nodes of an optical network, comprising:
    searching for a transmitting partner node from among nodes of the optical network by performing steps of:
        transmitting, using an optical interface of the node configured to receive and transmit broad-beam optical signals for optical communication with the other nodes, an optical synchronization signal during each of a plurality of subsequent timeslots of a cluster frame of the optical network;
        determining, following each transmission of the optical synchronization signal during subsequent timeslots of the cluster frame, whether an optical response signal is received at the optical interface from another optical node; and
        in response to determining that the optical response signal is received, selecting as the transmitting partner node the other optical node from which the optical response signal is received and storing the timeslot of the cluster frame associated with the transmitted optical synchronization signal.

15. The method of claim 14, wherein the node includes first and second broad-beam optical interfaces each configured to receive and transmit broad-beam uncollimated optical signals in different directions from each other, and
    the transmitting of the optical synchronization signal comprises transmitting the optical synchronization signal in each of the different directions using both the first and the second broad-beam optical interfaces.

16. The method of claim 14, further comprising:
    in response to selecting the other optical node as the transmitting partner node, transmitting, during the stored timeslot of subsequent cluster frames, an optical synchronization transmission;
    determining, following each transmission of the optical synchronization transmission, whether an optical response signal is received at the optical interface from the transmitting partner node; and
    in response to determining that the optical synchronization transmission is received, receiving, during the stored timeslot of the subsequent cluster frame, a data element from the transmitting partner node.

17. The method of claim 16, where the optical synchronization transmission is transmitted only during the stored timeslot from among all timeslots of a subsequent cluster frame.

18. The method of claim 16, where the optical synchronization transmission is transmitted only when the node does not store any data element for transmission on the optical network.

19. The method of claim 14, further comprising:
    storing a data element for transmission on the optical network; and
    in response to storing the data element, performing steps of:
        monitoring, during a timeslot associated with the node in each cluster frame, for an optical synchronization transmission received at the optical interface from a receiving partner node;
        in response to determining that the optical synchronization transmission is received from the receiving partner node, transmitting the data element to the receiving partner node during the timeslot associated with the node in subsequent cluster frames; and
        following transmission of the data element, delete the data element.

20. The method of claim 19, wherein the node is further configured to obtain as the data element a measurement from a sensor of the node, and to transmit the measurement to the receiving partner node during the timeslot associated with the node.

21. The method of claim 14, wherein the node is configured to select only one transmitting partner node as part of forming the optical network.

22. The method of claim 14, wherein the node is configured to receive, from one or more other nodes of the optical network, a data element, to transform the received data element according to a weight or bias value, and to transmit the transformed data element to one or more other nodes of the optical network.

23. The method of claim 22, wherein the node is further configured to receive, through the optical network, the weight or bias value, and to apply the received weight or bias value to received data elements.

* * * * *